US012773786B2

(12) United States Patent
Takahashi

(10) Patent No.: US 12,773,786 B2
(45) Date of Patent: Oct. 27, 2026

(54) ROBOT DEVICE, ROBOT DEVICE CONTROLLING METHOD, ARTICLE MANUFACTURING METHOD, AND RECORDING MEDIUM FOR INSERTION OF A PIN USING TWO MODES OF MOVEMENT

(71) Applicant: CANON KABUSHIKI KAISHA, Tokyo (JP)

(72) Inventor: Masakazu Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 105 days.

(21) Appl. No.: 18/889,020

(22) Filed: Sep. 18, 2024

(65) Prior Publication Data

US 2025/0100155 A1 Mar. 27, 2025

(30) Foreign Application Priority Data

Sep. 26, 2023 (JP) ................................ 2023-163125

(51) Int. Cl.
*B25J 9/16* (2006.01)
*B25J 9/02* (2006.01)
(Continued)

(52) U.S. Cl.
CPC ............... *B25J 9/1697* (2013.01); *B25J 9/02* (2013.01); *B25J 9/1664* (2013.01); *B25J 15/08* (2013.01);
(Continued)

(58) Field of Classification Search
CPC . B25J 9/1697; B25J 9/02; B25J 9/1664; B25J 15/08; B25J 9/1687; B25J 15/0253;
(Continued)

(56) References Cited

U.S. PATENT DOCUMENTS 11,685,042 B2 6/2023 Takahashi
11,872,698 B2 1/2024 Takahashi
(Continued)

FOREIGN PATENT DOCUMENTS

JP 2014151377 A * 8/2014
JP 2016120545 A * 7/2016
(Continued)

OTHER PUBLICATIONS

X. Wang, Y. Xiao, X. Fan and Y. Zhao, "Design and grip force control of dual-motor drive electric gripper with parallel fingers, " 2016 IEEE Information Technology, Networking, Electronic and Automation Control Conference, Chongqing, China, 2016, pp. 696-700, doi: 10.1109/ITNEC.2016.7560450. (Year: 2016).*

*Primary Examiner* — Ramon A. Mercado
*Assistant Examiner* — Moya Ly
(74) *Attorney, Agent, or Firm* — VENABLE LLP

(57) ABSTRACT

A robot device includes an imaging unit, an end effector including a base part and a moving part configured to move an object with respect to the base part, a robot configured to support the end effector in such a manner that the robot can move a position of the end effector, and a control unit configured to control the imaging unit, the moving part, and the robot. In a case where a movement control is executed to move a position of the object based on the image captured by the imaging unit and a target image, the control unit is configured to execute a first mode in which the position of the object is moved by controlling the robot to move the position of the end effector, and a second mode in which the position of the object is moved by controlling the moving part.

14 Claims, 13 Drawing Sheets

(51) Int. Cl.
*B25J 15/02* (2006.01)
*B25J 15/08* (2006.01)

(52) U.S. Cl.
CPC .......... *B25J 9/1687* (2013.01); *B25J 15/0273* (2013.01); *B25J 15/0286* (2013.01); *G05B 2219/40032* (2013.01); *G05B 2219/40033* (2013.01)

(58) Field of Classification Search
CPC .. B25J 15/026; B25J 15/0266; B25J 15/0273; B25J 15/0286; G05B 2219/40032; G05B 2219/40033
USPC .......................................................... 700/259
See application file for complete search history.

(56) References Cited

U.S. PATENT DOCUMENTS

| | | | | |
|---|---|---|---|---|
| 2009/0171371 | A1* | 7/2009 | Nixon | A61B 34/37 700/264 |
| 2012/0190981 | A1* | 7/2012 | Harris | A61B 5/14 604/95.01 |
| 2019/0143525 | A1* | 5/2019 | Ishihara | G05B 19/00 700/59 |
| 2023/0191592 | A1 | 6/2023 | Takahashi | |
| 2024/0042603 | A1 | 2/2024 | Takahashi | |

FOREIGN PATENT DOCUMENTS

| | | | |
|---|---|---|---|
| JP | 2019-89188 | A | 6/2019 |
| JP | 2020-168686 | A | 10/2020 |

* cited by examiner

ROBOT DEVICE, ROBOT DEVICE CONTROLLING METHOD, ARTICLE MANUFACTURING METHOD, AND RECORDING MEDIUM FOR INSERTION OF A PIN USING TWO MODES OF MOVEMENT

BACKGROUND OF THE INVENTION

Field of the Invention

The present invention relates to a robot device, a robot device controlling method, an article manufacturing method, and a recording medium.

Description of the Related Art

In recent years, there has been proposed a robot device having a robot arm in which an image is captured by a camera, and a position and a posture of the robot arm are corrected using the image (see JP 2019-89188 A). That is, in such a robot device, a target image is set as a reference, and the robot arm is controlled by so-called visual servo so that the captured image coincides with the set target image. As a result, relative positions of a target object and an end effector such as a robot hand mounted on a distal end of the robot arm can be aligned by correcting the position and posture of the robot arm. Therefore, it is not necessary to increase the accuracy in positioning the target object in advance or to precisely teach the robot arm in advance, making it possible to reduce the cost of the robot device and shorten the teaching time.

SUMMARY OF THE INVENTION

According to a first aspect of the present invention, a robot device includes an imaging unit configured to capture an image, an end effector including a base part and a moving part configured to move an object with respect to the base part, a robot configured to support the end effector in such a manner that the robot can move a position of the end effector, and a control unit configured to control the imaging unit, the moving part, and the robot. In a case where a movement control is executed to move a position of the object based on the image captured by the imaging unit and a target image, the control unit is configured to execute a first mode in which the position of the object is moved by controlling the robot to move the position of the end effector, and a second mode in which the position of the object is moved by controlling the moving part.

According to a second aspect of the present invention, a robot device controlling method includes a first step in which in a case where a movement control is executed to move a position of an object based on an image captured by an imaging unit and a target image, a control unit moves the position of the object by controlling a robot configured to movably support an end effector to move the position of the end effector, the end effector including a base part and a moving part configured to move the object with respect to the base part, and a second step in which in a case where the movement control is executed, the control unit moves the position of the object by controlling the moving part.

Further features of the present invention will become apparent from the following description of exemplary embodiments with reference to the attached drawings.

DESCRIPTION OF THE EMBODIMENTS

As described in JP 2019-89188 A, in a case where a robot arm is controlled by visual servo, for example, since the robot arm has multiple control axes like a six-axis articulated robot, the multiple control axes are simultaneously driven to move an end effector toward a target direction. However, since the multiple control axes are simultaneously feedback-controlled, it may take much time to converge alignment thereof to the target position.

Therefore, the present invention provides a robot device, a robot device controlling method, an article manufacturing method, a program, and a recording medium capable of shortening the time required when a movement of a position of an object is controlled based on a captured image and a target image.

First Embodiment

Hereinafter, a first embodiment for carrying out the present invention will be described with reference to FIGS. 1 to 12C.

Schematic Configuration of Robot System

Figure 1:
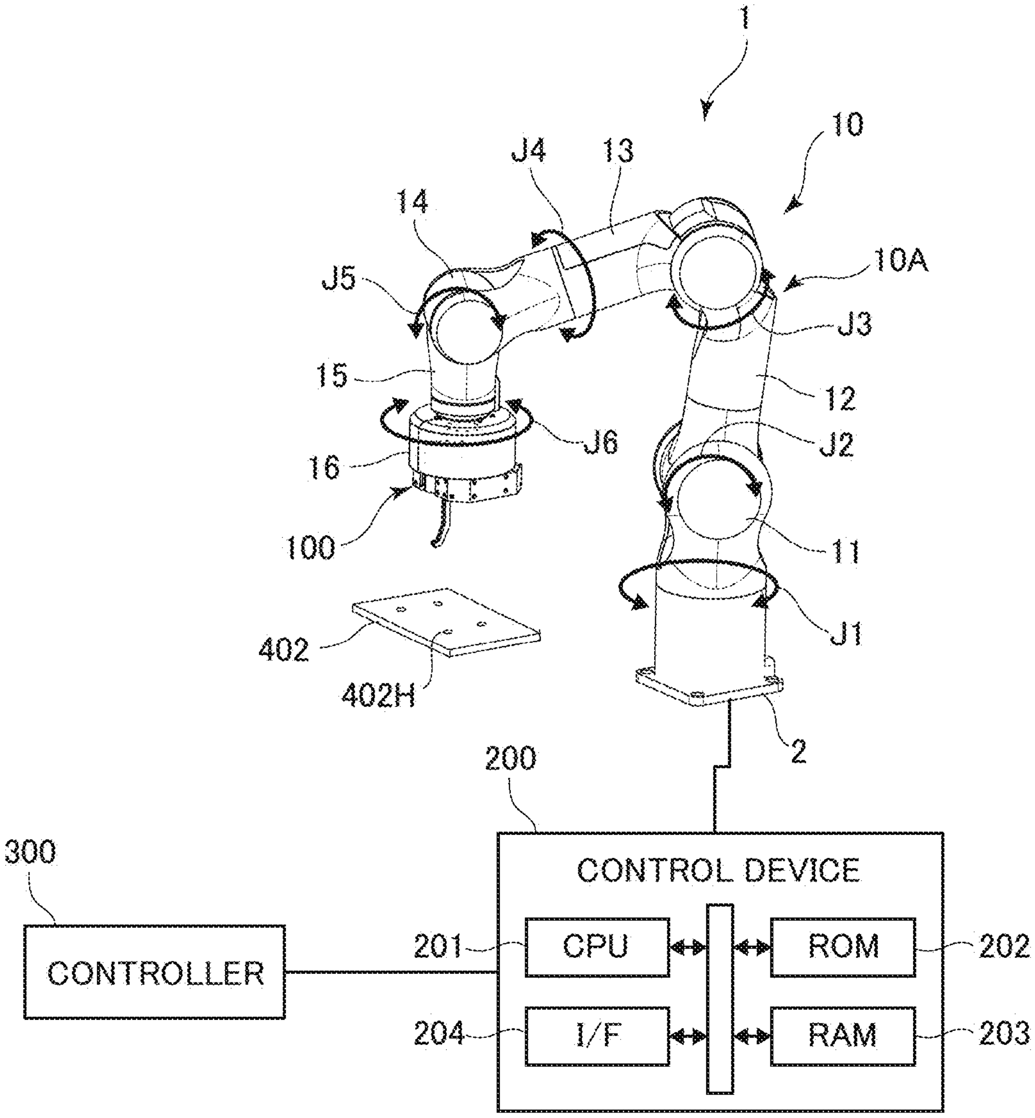
FIG. 1 is a view illustrating a robot system according to a first embodiment.

First, a schematic configuration of a robot system according to a first embodiment will be described with reference to FIG. 1. FIG. 1 is a view illustrating a robot system according to a first embodiment.

As illustrated in FIG. 1, a robot system 1 installed in a factory or the like includes a robot device 10 that grips and moves a pin W, which is a workpiece, from a pin placing table (not illustrated) on which the pin W, for example, that is metallic, is mounted as a workpiece, and inserts the pin W into a hole 402H of an assembly workpiece 402. The robot device 10 includes a pedestal 2, a robot arm 10A serving as a robot or a robot main body supported by the pedestal 2, and a robot hand 100 serving as an end effector attached to a distal end of the robot arm 10A. Furthermore, the robot device 10 includes a control device 200 that controls a camera 120 serving as an imaging unit, the robot arm 10A, and the robot hand 100 (a moving part 130 to be described below), and a controller 300 can be connected to the control device 200.

The pin placing table (not illustrated) has a plurality of holes into which pins W are to be inserted, and pins W to be supplied as components before work are installed in these holes. In addition, the assembly workpiece 402 has a hole 402H into which the pin W serving as a workpiece is inserted and fitted to be assembled. That is, the robot device 10, which will be described in detail below, executes an assembly control to perform work of assembling the pin W to the assembly workpiece 402, and the completed assembly workpiece 402 is manufactured as an article by assembling a plurality of pins W to the assembly workpiece 402.

The robot arm 10A is a so-called six-axis articulated manipulator, and includes a pedestal 2 that is a base part fixed to a work table or a surface plate, and a plurality of links 11, 12, 13, 14, 15, and 16 that transmit displacement and force. In addition, the robot arm 10A includes a plurality of joints J1, J2, J3, J4, J5, and J6 that connect the respective links 11 to 16 so as to be able to turn or rotate. The link 16 disposed at the distal end of the robot arm 10A is configured as a flange-shaped flange part to which the robot hand 100 is attached.

The control device 200 is constituted by a computer using a microprocessor element or the like, and is capable of controlling the robot device 10. As illustrated in FIG. 1, the computer constituting the control device 200 includes, for example, a CPU 201 serving as a control unit, a ROM 202 storing a program for controlling each unit, a RAM 203, and a communication interface (I/F in FIG. 1) 204. Among them, the RAM 203 is used to temporarily store data such as teaching points and control commands by operating the controller 300. Note that the program for controlling each unit can be installed in the ROM 202 from a recording medium, and may be read from the recording medium to the ROM 202 via the communication interface 204.

The controller 300 may be, for example, an operation device such as a teaching pendant (TP), but may be another computer device (PC or server) capable of editing a robot program. The controller 300 can be connected to the control device 200 via a wired or wireless communication connection unit, and has user interface functions for operating the robot and displaying a status. The CPU 201 receives, for example, teaching point data input by the controller 300 from the communication interface 204. In addition, a track of each axis (each link) of the robot device 10 can be generated based on the teaching point data input from the controller 300, and can be transmitted to the robot device 10 as a control target value via the communication interface 204. As a result, the robot device 10 can operate the pin W, which is an operation target, using the robot hand 100 attached to the distal end of the robot arm 10A.

Configuration of Robot Hand

Figure 2:
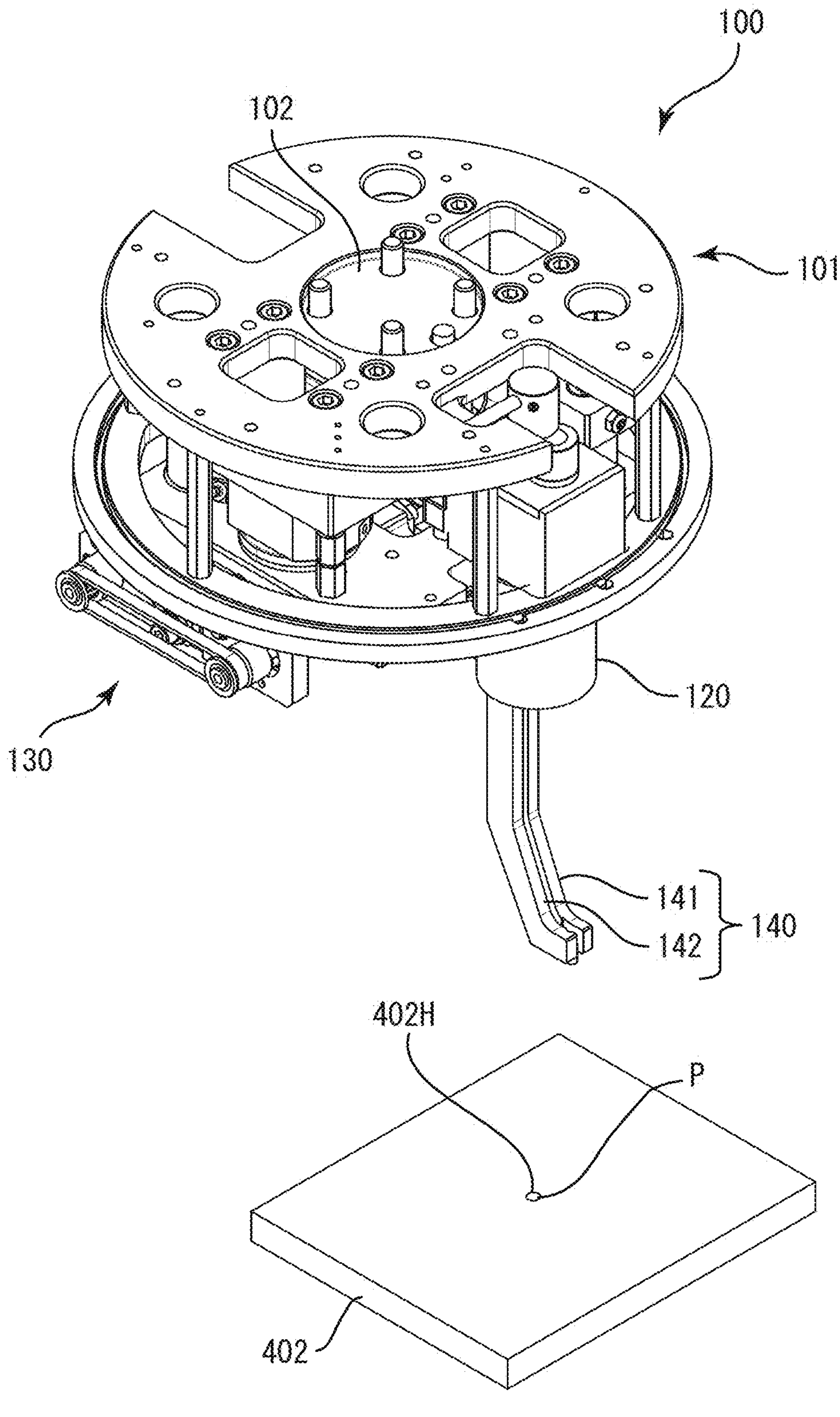
FIG. 2 is a perspective view illustrating a robot hand according to the first embodiment.
Figure 3:
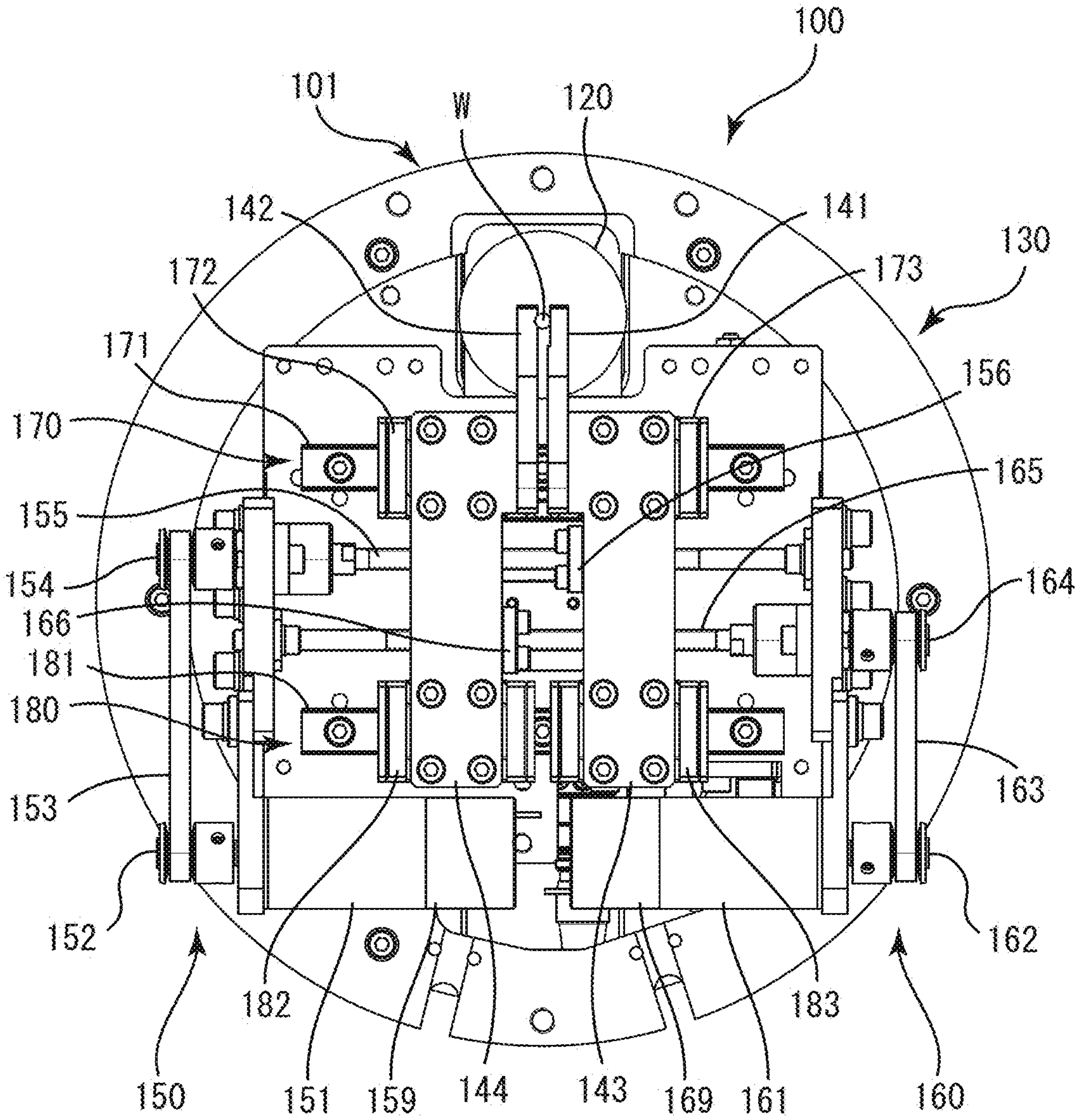
FIG. 3 is a bottom view illustrating a robot hand in a state where a workpiece gripped by a finger part is positioned within a field of view of a camera.
Figure 4:
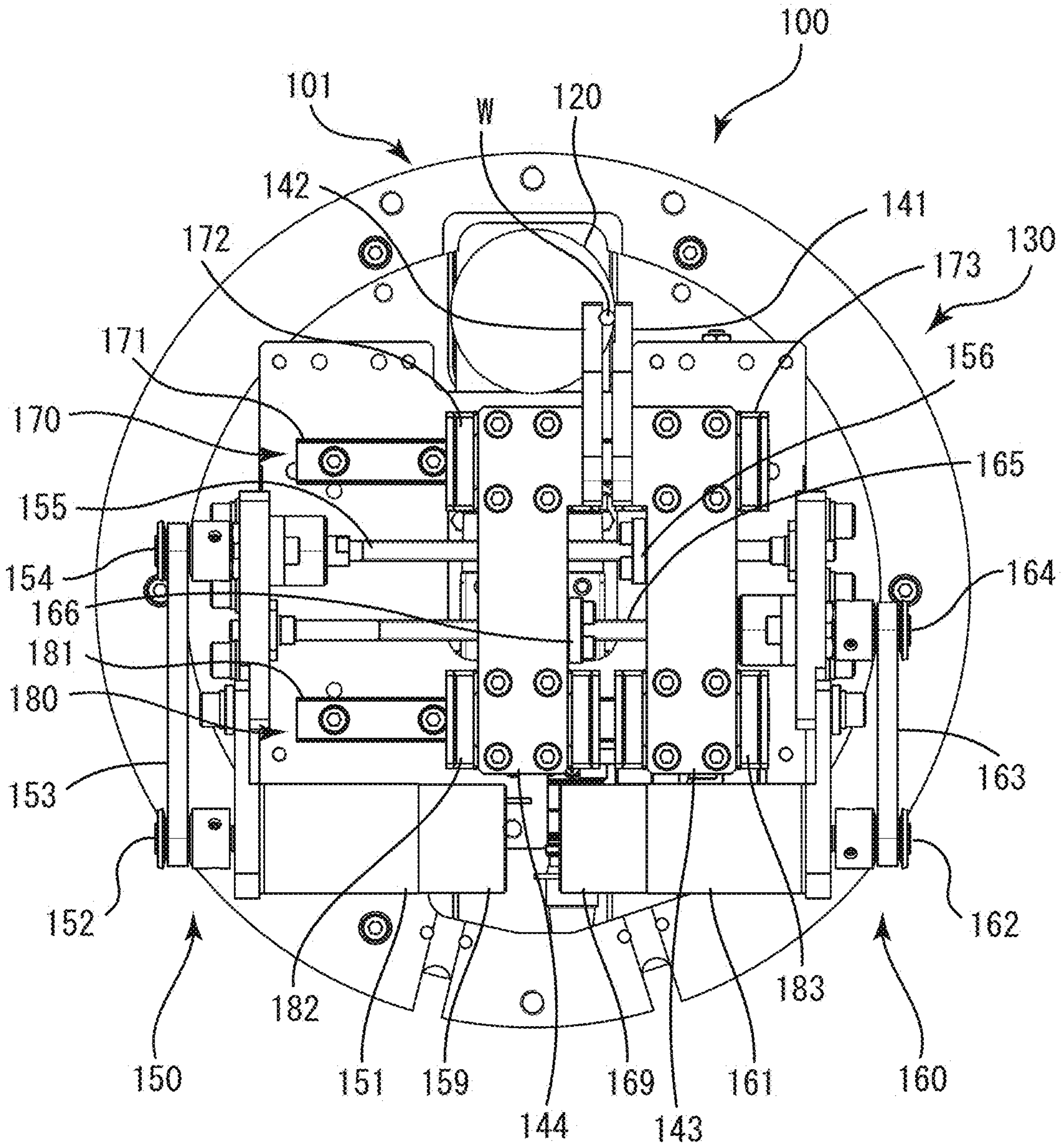
FIG. 4 is a bottom view illustrating a robot hand in a state where a workpiece gripped by a finger part is positioned outside a field of view of a camera.
Figure 5:
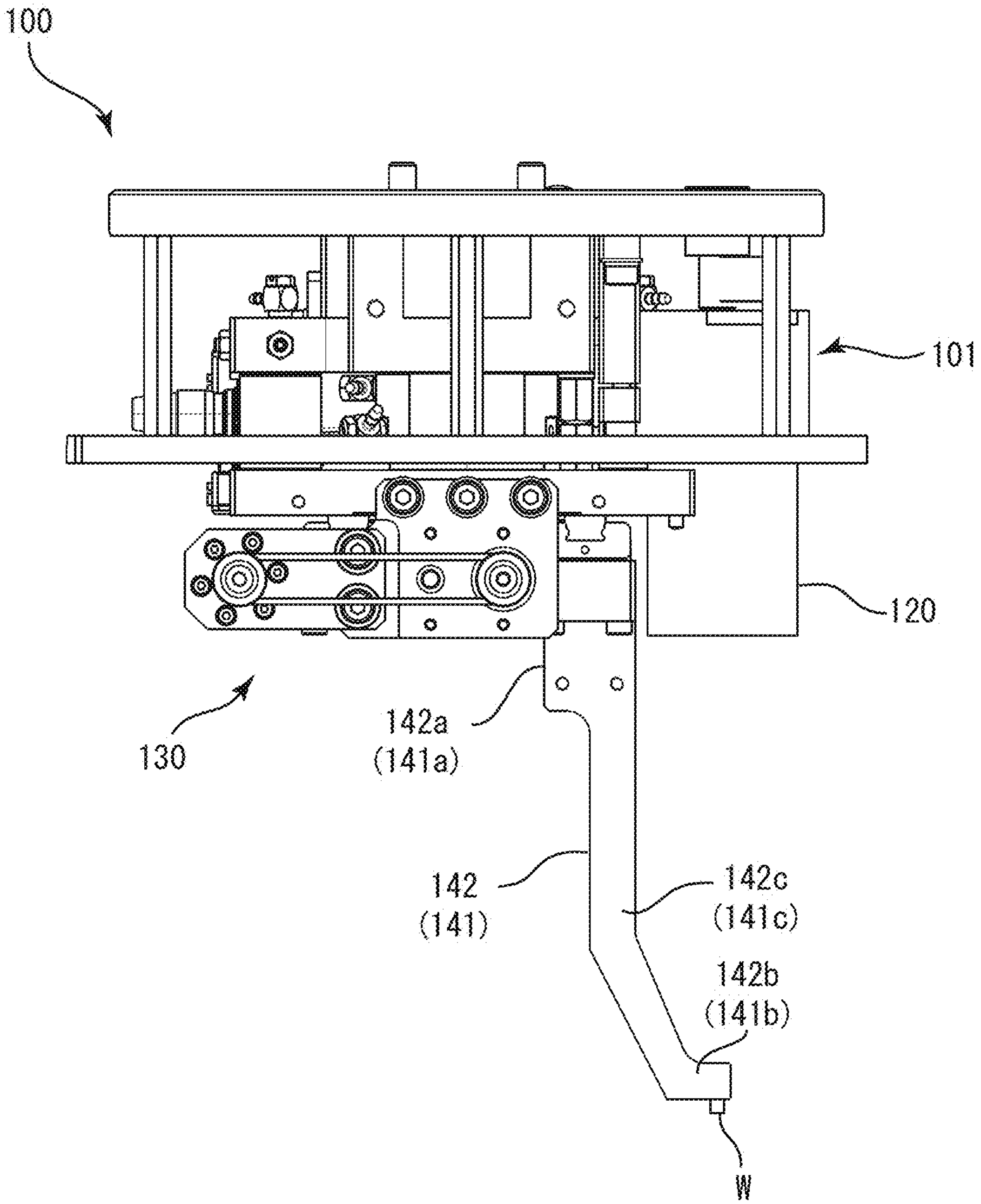
FIG. 5 is a side view illustrating a configuration of a finger part of a robot hand.
Figure 6A:
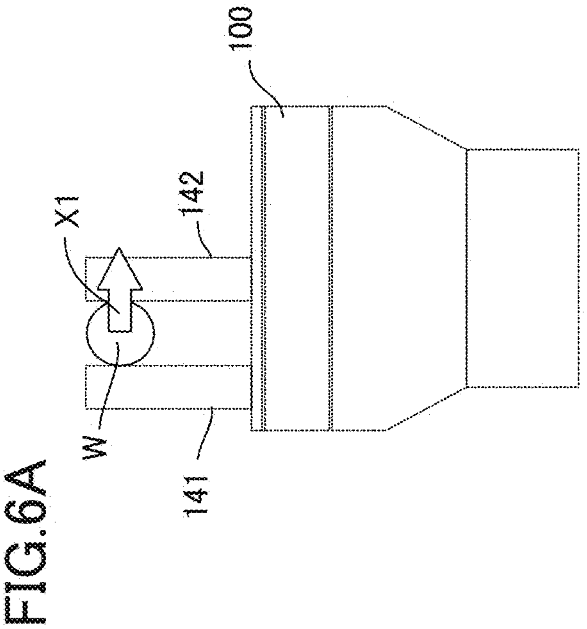
FIG. 6A is a schematic view illustrating a state in which a workpiece is gripped by a finger part.
Figure 6B:
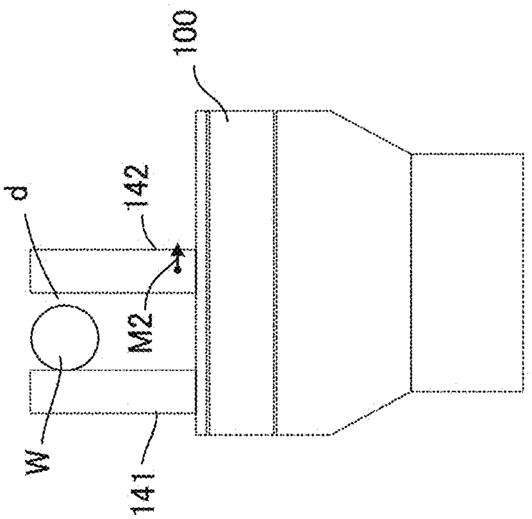
FIG. 6B is schematic view illustrating a gripped state of a workpiece when a second finger moves first.
Figure 6C:
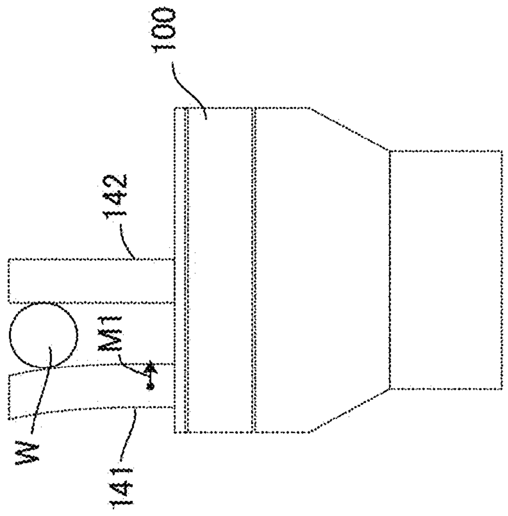
FIG. 6C is a schematic view illustrating a gripped state of a workpiece when a first finger moves first.

Next, a detailed configuration of a robot hand 100 will be described with reference to FIGS. 2, 3, 4, 5, and 6A to 6C. FIG. 2 is a perspective view illustrating a robot hand according to the first embodiment. FIG. 3 is a bottom view illustrating a robot hand in a state where a workpiece gripped by a finger part is positioned within a field of view of a camera. FIG. 4 is a bottom view illustrating a robot hand in a state where a workpiece gripped by a finger part is positioned outside a field of view of a camera. FIG. 5 is a side view illustrating a configuration of a finger part of a robot hand. FIG. 6A is a schematic view illustrating a state in which a workpiece is gripped by a finger part. FIG. 6B is a schematic view illustrating a gripped state of a workpiece when a second finger moves first. FIG. 6C is a schematic view illustrating a gripped state of a workpiece when a first finger moves first.

As illustrated in FIG. 2, the robot hand 100 is detachably attached to the distal end of the robot arm 10A (see FIG. 1). The robot hand 100 roughly includes a base part 101 serving as a main body, a camera 120, a finger part 140 serving as a gripping part that is a tool, and a moving part 130 that drives the finger part 140 to move. The base part 101 has an attachment portion 102 attached to the link 16 (see FIG. 1) of the robot arm 10A, and the camera 120 capable of capturing an image is fixed to and supported by the base part 101. The camera 120 is moved by controlling the robot arm 10A, so that the robot hand 100 is positioned above and away from the assembly workpiece 402 by a predetermined distance, thereby controlling a focal position P to be in the hole 402H of assembly workpiece 402. As a result, the camera 120 can image the hole 402H that is an imaging target, a work target, and a contact position.

In addition, a first finger 141 and a second finger 142 constituting the finger part 140 capable of executing work on the pin W, which is a workpiece, is movably supported by the base part 101. A fingertip portion 141*b* of the first finger 141 and a fingertip portion 142*b* of the second finger are configured to be able to abut on the pin W from respective directions to support the pin W by sandwiching and gripping pin W therebetween. The fingertip portion 141*b* of the first finger 141 and the fingertip portion 142*b* of the second finger are located between the base part 101 and the focal position P of the camera 120 within the field of view of camera 120 as will be described in detail below. As a result, the camera 120 can capture an image farther than the first finger 141 and the second finger 142, and perform various controls based on the image.

Next, the moving part 130 that drives the finger part 140 to move will be described. As described above, as illustrated in FIGS. 2 and 3, the finger part 140 includes a first finger 141 and a second finger 142, and is configured to be able to grip the pin W, which is a workpiece. The first finger 141 is fixed to a first slider 143 supported by the base part 101, and the second finger 142 is fixed to a second slider 144 supported by the base part 101. In addition, the moving part 130 includes a first guide part 170 and a second guide part 180 that movably guide the first slider 143 and the second slider 144, a first driving part 150 that drives the first slider 143, and a second driving part 160 that drives the second slider 144.

Specifically, the first guide part 170 serving as a sliding part includes a first linear motion guide 171, and a movable part 172 and a movable part 173 slidably supported thereby. Also, the second guide part 180 serving as a sliding part includes a second linear motion guide 181, and a movable part 182 and a movable part 183 slidably supported thereby. The first slider 143 is fixed to the movable part 173 and the movable part 183, and the second slider 144 is fixed to the movable part 172 and the movable part 182.

On the other hand, the first driving part 150 roughly includes a motor 151, a driving pulley 152, a belt 153, a driven pulley 154, a ball screw shaft 155, a ball nut 156, and an angle detection sensor 159. That is, the motor 151 outputs a driving rotation, and the driving pulley 152 fixed to an output shaft of the motor 151 is driven to rotate. The belt 153 is stretched between the driving pulley 152 and the driven pulley 154, and the rotation of the driving pulley 152 is transmitted to the driven pulley 154. The driven pulley 154 is fixed to one end of the ball screw shaft 155 to rotate the ball screw shaft 155, thereby sliding the ball nut 156 fixed to the first slider 143 in the axial direction via a ball (not illustrated). Accordingly, the first slider 143 slides linearly in the axial direction of the ball screw shaft 155 (in the direction along the first linear motion guide 171 and the second linear motion guide 181) while being guided by the first guide part 170 and the second guide part 180. Therefore, the first finger 141 is driven to move in the axial direction of the ball screw shaft 155 according to a rotation direction of the motor 151. For example, when the motor 151 is rotated forward, the first finger 141 moves to one side toward the right in the drawing, and when the motor 151 is rotated backward, the first finger 141 moves to the other side toward the left in the drawing. A rotation angle of the motor 151 is detected by the angle detection sensor 159 constituted by, for example, an encoder, and is output to the control device 200. Based thereon, the CPU 201 determines a position of the first finger 141 by performing a calculation, and controls the position of the first finger 141 by issuing a command for driving the motor 151 based on the position.

Similarly, the second driving part 160 roughly includes a motor 161, a driving pulley 162, a belt 163, a driven pulley 164, a ball screw shaft 165, a ball nut 166, and an angle detection sensor 169. That is, the motor 161 outputs a driving rotation, and the driving pulley 162 fixed to an output shaft of the motor 161 is driven to rotate. The belt 163 is stretched between the driving pulley 162 and the driven pulley 164, and the rotation of the driving pulley 162 is transmitted to the driven pulley 164. The driven pulley 164 is fixed to one end of the ball screw shaft 165 to rotate the ball screw shaft 165, thereby sliding the ball nut 166 fixed to the second slider 144 in the axial direction via a ball (not illustrated). Accordingly, the second slider 144 linearly slides in the axial direction of the ball screw shaft 165 while being guided by the first guide part 170 and the second guide part 180. Therefore, the second finger 142 is driven to move in the axial direction of the ball screw shaft 165 according to a rotation direction of the motor 161. For example, when the motor 161 is rotated forward, the second finger 142 moves to one side toward the left in the drawing, and when the motor 161 is rotated backward, the second finger 142 moves to the other side toward the right in the drawing. A rotation angle of the motor 161 is detected by the angle detection sensor 169 constituted by, for example, an encoder, and is output to the control device 200. Based thereon, the CPU 201 determines a position of the second finger 142 by performing a calculation, and controls the position of the second finger 142 by issuing a command for driving the motor 161 based on the position.

With the configuration of the moving part 130 as described above, the first finger 141 and the second finger 142 can independently move on the same first linear motion guide 171 and second linear motion guide 181. As a result, when the first finger 141 and the second finger 142 move while gripping the pin W, a deviation between the relative positions of the first finger 141 and the second finger 142 in a direction other than the movement direction can be reduced, making it easier to control the movement of the finger part while gripping the pin W.

In addition, by installing the second linear motion guide 181 on the opposite side of the gripped position of the pin W with the first linear motion guide 171 interposed therebetween, a moment force generated when installing the pin W can be supported by the two linear motion guides. Accordingly, the durability of the first linear motion guide 171 and the second linear motion guide 181 can be improved.

When the pin W is gripped by the first finger 141 and the second finger 142, first, a rotation angle of the motor 151 is detected by the angle detection sensor 159, and a rotation angle of the motor 161 is detected by the angle detection sensor 169. Then, based on values thereof, the CPU 201 controls the motor 151 and the motor 161 so that the first finger 141 and the second finger 142 are as far away from each other as the pin W, and are positioned with the pin W therebetween. As a result, the pin W is gripped by the first finger 141 and the second finger 142.

In addition, the first finger 141 and the second finger 142 can move in the same direction along the first linear motion guide 171 and the second linear motion guide 181 while maintaining the distance therebetween, that is, can move while gripping the pin W That is, the first finger 141 and the second finger 142 can be moved from the position illustrated in FIG. 3 to the position illustrated in FIG. 4. The state illustrated in FIG. 4 is a state in which the first finger 141, the second finger 142, and the pin W are retracted to a retracted position outside the field of view of the camera 120 (hereinafter, simply referred to as "outside the field of view").

Here, an operation in a case where the finger part 140 gripping the pin W is moved by the moving part 130 will be described. For example, as illustrated in FIG. 6A, the first finger 141 abuts on one side of the pin W (that is, abuts on the pin in a direction indicated by an arrow X1 that is a direction from one side to the other side), and the second finger 142 abuts on the other side of the pin W (that is, abuts on the pin in a direction from the other side toward the one side (a direction opposite to the direction indicated by the arrow X1)), whereby the pin W is sandwiched and gripped. From this state, the first finger 141 and the second finger 142 are slid by the moving part 130 in the direction indicated by the arrow X1 from one side toward the other side in the first guide part 170 and the second guide part 180. As described above, the first finger 141 and the second finger 142 can be independently driven to move. In this case, even if a command for simultaneously moving the first finger 141 and the second finger 142 is issued, an error in command transmission timing, an error in driving the first driving part 150 and the second driving part 160, or the like may occur. Then, as illustrated in FIG. 6B, the second finger 142 may move earlier as indicated by an arrow M2, and a gap d may be generated between the pin W and the second finger 142, thereby causing the pin W to fall. Therefore, as illustrated in FIG. 6C, when the pin W is moved in the direction indicated by the arrow X from one side toward the other side by the finger part 140 moved by the moving part 130, the first finger 141 abutting on one side of the pin W is driven earlier than the second finger 142 as indicated by an arrow M1. As a result, the first finger 141 (or the second finger 142) is slightly bent in an elastically deformed manner, but the pin W can be kept sandwiched between the first finger 141 and the second finger 142 without forming a gap d from the pin W.

Next, shapes of the first finger 141 and the second finger 142 will be described with reference to FIG. 5. The second finger 142 includes a second root portion 142*a* fixed to the second slider 144, a second fingertip portion 142*b* brought into contact with the pin W to grip the pin W, and a second connecting portion 142*c* that connects the second root portion 142*a* and the second fingertip portion 142*b*. Similarly, the first finger 141 also includes a first root portion 141*a* fixed to the first slider 143, a first fingertip portion 141*b* brought into contact with the pin W to grip the pin W, and a first connecting portion 141*c* that connects the first root portion 141*a* and the first fingertip portion 141*b*. Note that, since the shape of the first finger 141 and the shape of the second finger 142 are substantially the same, the shape of the second finger 142 will be described, and the description of the first finger 141 will be omitted.

The second root portion 142*a* is disposed at a position offset to the left side in FIG. 5 with respect to the imaging direction (that is, the optical axis direction) of the camera 120, and is linearly slid as described above at a position that does not intersect with the imaging direction. The second connecting portion 142*c* is formed in a bent shape so that the second fingertip portion 142*b* faces the imaging direction, that is, the second fingertip portion 142*b* is inside the field of view of the camera 120 (hereinafter, simply referred to as "the inside of the field of view"). That is, since the second fingertip portion 142*b* moves linearly in parallel to the second root portion 142*a* as the second root portion 142*a* slides, and thus moves from the outside of the field of view to the outside of the field of view through the inside of the field of view of camera 120.

By forming the shapes of the first finger 141 and the second finger 142 in this manner, the first fingertip portion 141*b*, the second fingertip portion 142*b*, and the gripped pin W can be imaged by the camera 120. In addition, the first connecting portion 141*c*, the second connecting portion 142*c*, the first root portion 141*a*, and the second root portion 142*a* other than first fingertip portion 141*b* and the second fingertip portion 142*b* are not captured in the image captured by the camera 120. As a result, it is possible to minimize an area where the first finger 141 and the second finger 142 overlap a work position (the hole 402H of the assembly workpiece 402, a hole 401H of the pin placing table 401, the pin W placed on the pin placing table 401, or the like) when the camera 120 captures an image. Further, with such a bent shape, even though the first finger 141 and the second finger 142 are moved, it is possible to achieve a structure capable of imaging the first fingertip portion 141*b* and the second fingertip portion 142*b* without interfering with the camera 120 in a compact manner. Accordingly, the size of the robot hand 100 can be reduced.

Details of Visual Servo Control

Figure 7:
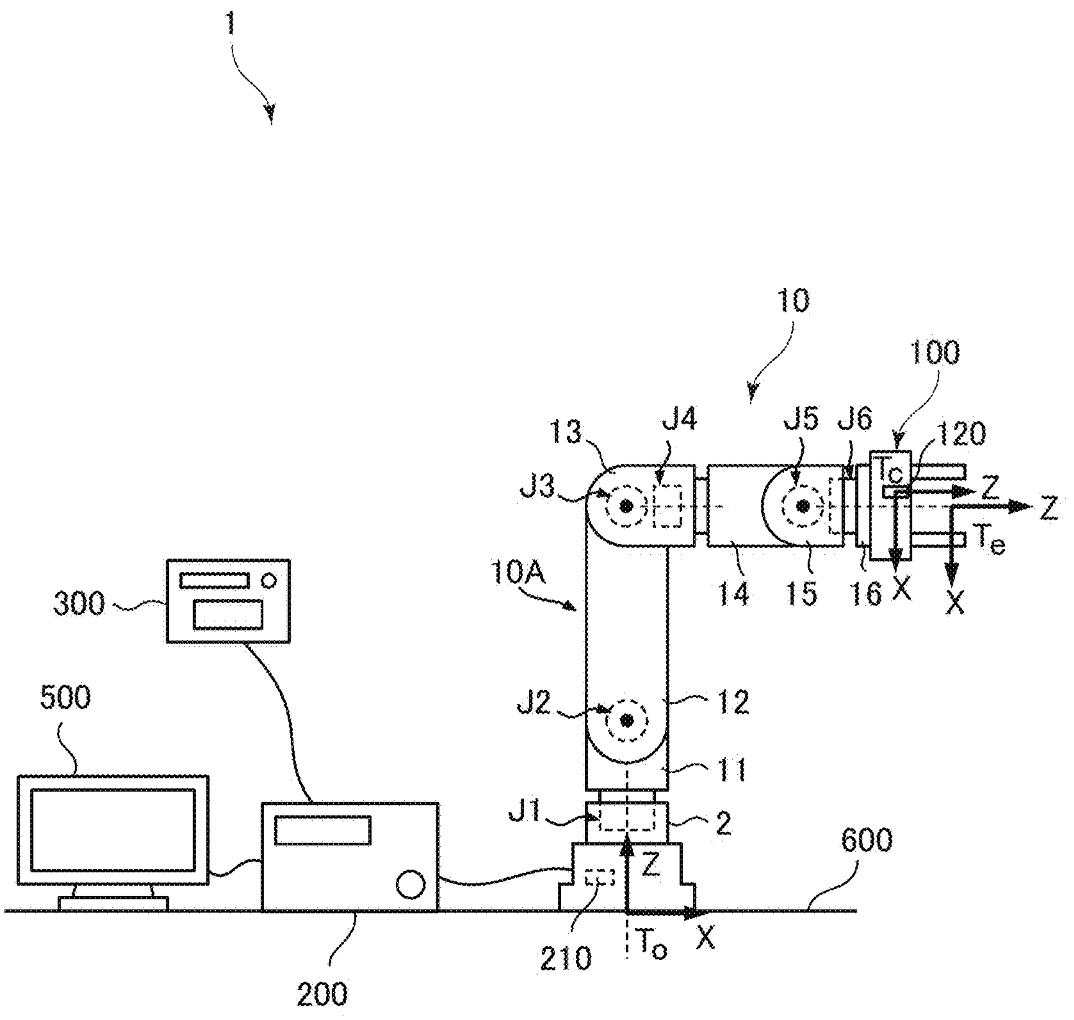
FIG. 7 is a schematic view illustrating a configuration of the robot system according to the first embodiment and each coordinate system.
Figure 8:
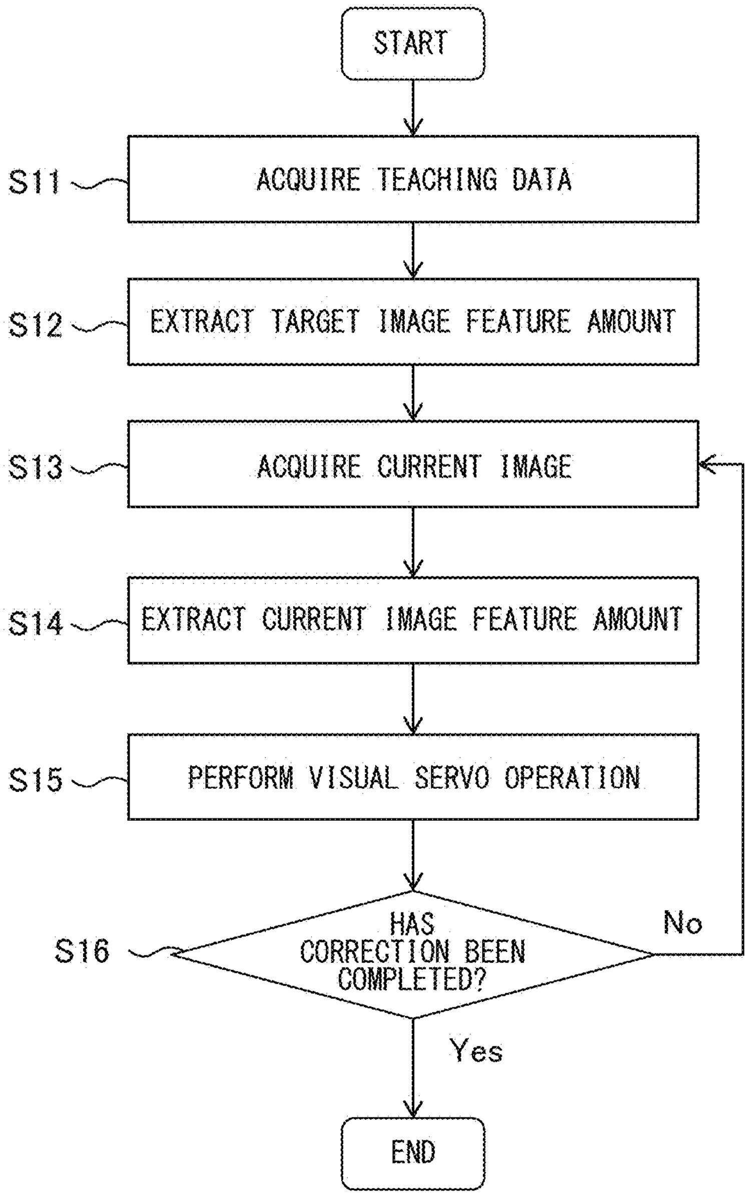
FIG. 8 is a flowchart illustrating a movement control of a workpiece by a visual servo control.
Figure 9:
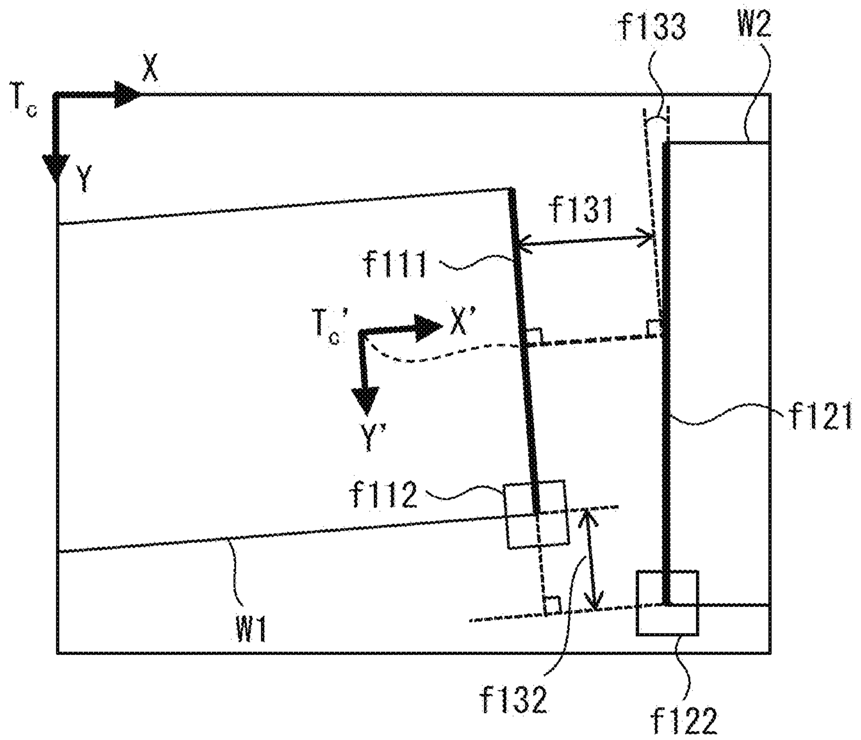
FIG. 9 is a view illustrating an extraction of a target image feature amount in a target image used in the visual servo control.

Next, a visual servo control will be described with reference to FIGS. 7, 8, and 9. FIG. 7 is a schematic view illustrating a configuration of the robot system according to the first embodiment and each coordinate system. FIG. 8 is a flowchart illustrating a movement control of a workpiece by a visual servo control. FIG. 9 is a view illustrating an extraction of a target image feature amount in a target image used in the visual servo control.

In the present embodiment, the "visual servo" refers to an operation of moving the robot arm 10A based on a captured image and a target image to align an object to a target position. Furthermore, the "visual servo control" refers to a series of controls for performing a visual servo operation. That is, the visual servo control is one method of controlling a movement of a position/posture of the robot arm 10A, and is a control method in which a change in position of a target object is measured as visual information and the measured change is used as information for feedback control. In addition, in the visual servo control according to the present embodiment, a control is performed to extract an image feature included in an image of an object on a current image and a difference from an image feature on a target image is fed back. Specifically, an alignment or a position correction of the pin W gripped by the robot hand 100 with respect to the hole 402H of the assembly workpiece 402, which is an imaging target, is performed.

Robot System and Coordinate System

Here, first, a robot system 1 for executing a visual servo control and a coordinate system of each unit in the robot system 1 will be described with reference to FIG. 7. As illustrated in FIG. 7, the robot system 1 includes a robot device 10, a control device 200, and a controller 300 serving as an input device as described above (see FIG. 1). Note that a display 500 serving as a display unit is connected to the control device 200. Furthermore, the robot device 10 includes a servo control unit 210 that controls a servo (not illustrated) in each of the joints J1 to J6 of the robot arm 10A. The camera 120 attached to the robot hand 100 is an example of an imaging unit, and is, for example, a digital camera. The camera 120 is a two-dimensional camera, and can acquire two-dimensional image information by imaging a subject. Note that the camera 120 is not limited to the two-dimensional camera, and may be, for example, a three-dimensional camera.

As described above, in the present embodiment, the robot arm 10A is a vertically articulated robot arm. A proximal end (fixed end) of the robot arm 10A is installed on a stand 600. The robot hand 100 is attached to the distal end (free end) of the robot arm 10A. The robot arm 10A includes a pedestal 2, a plurality of links 11 to 16, and a plurality of joints J1 to J6. The plurality of links 11 to 16 are connected to one another in series via the plurality of joints J1 to J6 in this order. It is assumed that the first joint J1, the second joint J2, the third joint J3, the fourth joint J4, the fifth joint J5, and the sixth joint J6 are located in this order from the proximal end side (the link 11 side) toward the distal end side (the link 16 side) of the robot arm 10A. The link 11, which is a proximal end portion of the robot arm 10A, is fixed to the pedestal 2. The pedestal 2 is fixed to an upper surface of the stand 600. Each of the links 11 to 16 is driven to move (may be driven to expand and contract) around a control axis of each of the joints J1 to J6. As a result, the robot arm 10A can adjust the robot hand 100 to a certain position in the three-axis direction and a certain posture in the three-axis direction.

The robot hand 100 is provided on the link 16, which is a distal end portion of the robot arm 10A. That is, the link 16 is a supporter configured to support the end effector such as the robot hand 100. In short, the position of the link 16 is the position of the robot hand 100. However, by driving the sixth joint J6, the postures of the link 16 and the robot hand 100 are changed around the control axis thereof. Only the first joint J1 to the fifth joint J5 may be controlled to be driven by the visual servo to be described below to control the position of the robot hand 100, that is, the sixth joint J6 may not be driven by the visual servo.

The posture of the robot arm 10A can be expressed by a coordinate system. That is, the CPU 201 can calculate a coordinate system $T_0$ of the robot device 10, a coordinate system $T_e$ of the robot hand 100 (end effector), and a coordinate system $T_c$ of the camera 120. That is, the coordinate system $T_0$ in FIG. 7 is a coordinate system set on the stand 600 to which the robot arm 10A is fixed. The coordinate system $T_e$ is a coordinate system set in the robot hand 100. The coordinate system $T_e$ represents a tool center position (TCP). For example, the coordinate system $T_e$ is set in the robot hand 100. The coordinate system $T_0$ and the coordinate system $T_e$ are represented by orthogonal coordinates of three axes including X, Y, and Z axes.

The coordinate system $T_c$ is a coordinate system set around the camera 120, is represented by orthogonal coordinates of three axes including X, Y, and Z axes similarly to the coordinate system $T_o$ and the coordinate system $T_e$, and is set such that the optical axis direction of the camera 120 is the Z-axis direction. In the present embodiment, since the camera 120 is fixed to the robot hand 100, the coordinate system $T_c$ and the coordinate system $T_e$ coincide with each other. However, the camera may be fixed to a ceiling of a factory where the robot system 1 is installed, a predetermined position of the robot arm 10A, or the like, and the coordinate system $T_e$ and the coordinate system $T_c$ may be different coordinate systems.

The servo control unit 210 controls a servo (motor) (not illustrated) for each of the joints J1 to J6 to be driven. The servo control unit 210 is disposed, for example, inside the pedestal 2. The position where the servo control unit 210 is disposed is not limited to the inside of the pedestal 2, and the servo control unit 210 may be disposed anywhere. For example, the servo control unit 210 may be disposed inside a casing of the control device 200. That is, the servo control unit 210 may be a part of the configuration of the control device 200. The servo control unit 210 controls the servos of the joints J1 to J6 to be driven based on command values corresponding to the respective joints J1 to J6 acquired from the control device 200 such that the angles or torques of the respective joints J1 to J6 follow the command values. That is, the servo control unit 210 is configured to be able to control a position or a torque of each joint of the robot arm 10A.

Visual Servo Control

Next, a movement control of a workpiece by a visual servo control will be described with reference to FIG. 8. The CPU 201 executes a program to execute a movement control of a workpiece by a visual servo control illustrated in FIG. 8. Note that the movement control of the workpiece by the visual servo control illustrated in FIG. 8 may be executed as a part of a movement control of a workpiece illustrated in FIG. 10, which will be described in detail below, but may be selectively executed separately from the movement control of the workpiece illustrated in FIG. 10. That is, the movement control of the workpiece by the visual servo control illustrated in FIG. 8 may be executed as a first mode, and the movement control of the workpiece including a movement of a finger part illustrated in FIG. 10, which will be described below, may be executed as a second mode. The mode may be selected manually by an operator, or may be automatically switched according to the shape of the workpiece, the state of the robot device, or the like.

As illustrated in FIG. 8, when a movement control of a workpiece by a visual servo control is started, first, the CPU 201 acquires teaching data recorded in the RAM 203 or the like (S11). Here, the teaching data is a target image captured by the camera 120 when the work of the robot arm 10A is taught.

Next, the CPU 201 extracts a target image feature amount from the target image (S12). That is, as illustrated in FIG. 9, the CPU 201 extracts, from the target image, for example, edges f111 and f121 of workpieces W1 and W2 closest to each other, and predetermined portions f112 and f122 of the workpieces W1 and W2. The predetermined portions are, for example, end points of the edges f111 and f121 in the respective the workpieces W1 and W2. As a method of extracting the edges f111 and f121 and the predetermined portions f112 and f122, a known method can be freely used.

For example, a line segment detection method using a Hough transform can be used to extract the edges f111 and f121. The predetermined portions f112 and f122 may be extracted based on results of extracting the edges f111 and f121. More preferably, the edges f111 and f121 and the predetermined portions f112 and f122 are extracted using different methods. For example, a line segment detection method using a Hough transform is used to extract the edges f111 and f121, and template matching is used to extract the predetermined portions f112 and f122. Then, even if an erroneous image feature is extracted due to a failure in image processing, an error can be detected by comparing the results of extracting the edges f111 and f112 or the results of extracting the predetermined portions f121 and f122.

When template matching is used to extract the predetermined portions f112 and f122, in step S12, values input by an operator or values recorded in the ROM 202 or the like are registered as positions and sizes of the predetermined portions f112 and f122. Then, the corresponding range of the target image may be registered as a template. The registered template is temporarily recorded in the RAM 203 or the like.

A coordinate system Tc' is a coordinate system on the target image, with a perpendicular bisector of the edge f111 as an image feature being an X axis and a direction along the edge f111 being a Y axis on the target image. The target image feature amount is calculated by coordinates on the coordinate system Tc'. For example, the target image feature amount includes three values of a distance f131 between points at which the edges f111 and f121 and the X axis intersect, a difference f132 in the Y'-axis direction between the positions of the predetermined portions f12 and f122, and an angle f133 formed by the edges f111 and f121. That is, the target image feature amount can be expressed by a three-dimensional vector including the distance f131, the position difference f132, and the angle f133 as target image feature amount $F_g$=[f131 f132 f133]T. The subscript T represents transposition of the vector or matrix.

Subsequently, the CPU 201 acquires a current captured image (hereinafter, referred to as a "current image") from the camera 120 (S13). The current image is temporarily recorded, for example, in the RAM 203 or the like.

Next, the CPU 201 extracts a current image feature amount from the current image by a method similar to the method of extracting the target image feature amount from the target image in step S12 (S14). Hereinafter, the components of the target image feature amount are denoted by fg131, fg132, and fg133, respectively, and the components of the current image feature amount are denoted by fc131, fc132, and fc133, respectively. That is, the target image feature amount $F_g$=[fg131 fg132 fg133]T and the current image feature amount $F_c$=[fc131 fc132 fc133]$^T$ are set.

Next, the CPU 201 calculates a control amount $q_v$ of the control axis for each of the joints J1 to J6 of the robot from the target image feature amount Fg and the current image feature amount Fc, and performs a visual servo operation of the robot arm 10A (S15). In calculating the control amount $q_v$, first, a feature amount difference $F_e$ (F is in bold) between the current image feature amount Fc and the target image feature amount Fg is calculated according to the following Formula 1.

Formula 1

$$F_e = \begin{bmatrix} fc131 - fg131 \\ fc132 - fg132 \\ fc133 - fg133 \end{bmatrix} \quad (1)$$

Subsequently, the CPU 201 calculates a matrix of image Jacobian $J_{img}$ (J is in bold) and a matrix of robot Jacobian $J_r$ (J is in bold). The image Jacobian $J_{img}$ is a matrix of 3 rows and 3 columns associating a minute displacement amount of the current image feature amount Fc with a minute displacement amount of the coordinate system Te set in the robot hand 100. The robot Jacobian $J_r$ is a matrix of 3 rows and 6 columns associating minute displacement amounts of the joints J1 to J6 of the robot arm 10A with minute displacement amount of the coordinate system Te set in the robot hand 100. The image Jacobian $J_{img}$ and the robot Jacobian $J_r$ are defined according to the following Formula 2.

Formula 2

$$J_{img} = \frac{\partial F_c}{\partial x_e^T},\ J_r = \frac{\partial x_e}{\partial q^T} \quad (2)$$

Here, $x_e$ (x is in bold) denotes a position vector $x_e=[X_e\ Y_e\ \alpha_e]^T$ with three degrees of freedom of the coordinate system Te in the coordinate system To, and $\alpha_e$ denotes a rotation angle around the Z axis of the coordinate system To. q (q is in bold) denotes a joint angle vector $q=[q_1 \ldots q_6]$T of the joints J1 to J6 of the robot arm 10A.

Subsequently, the CPU 201 calculates a control amount $q_v$ (q is in bold) of each of the joints J1 to J6 of the robot arm 10A. The control amount $q_v$ is calculated, for example, according to the following Formula 3.

Formula 3

$$q_v = -J_r^{+} \lambda J_{img}^{-1} F_e \quad (3)$$

(is in bold) in Formula 3 is a feedback gain represented by a three-dimensional vector, and the subscript − represents an inverse matrix, and the subscript + represents a pseudo inverse matrix. Note that the method of calculating the control amount $q_v$ from the feature amount difference $F_e$ is not limited to the above-described method, and another known method may be freely used. The CPU 201 calculates a new angle command value by adding the control amount $q_v$ to a previous angle command value for each of the joints J1 to J6 of the robot arm 10A. Then, the CPU 201 performs a visual servo operation by operating the robot arm 10A via the servo control unit 210 based on the angle command value.

Then, the CPU 201 determines whether the position correction operation by the visual servo has been completed (S16). When the feature amount difference $F_e$ is smaller than or equal to a predetermined value, it is determined that the correction operation has been completed, and the operation is completed (Yes in S16). When the feature amount difference $F_e$ is not smaller than or equal to the predetermined value (No in S16), the process returns to step S13 to repeat the above-described processing. Here, the predetermined value is a value with which a determination can be made with accuracy that is sufficient to reliably perform assembly work in subsequent force control (torque control). In addition, when it is determined that the feature amount difference $F_e$ is smaller than or equal to the predetermined value, all the values included in the feature amount difference $F_e$ may be determined using the same value, or the determination may be performed using different values, and the correction operation may continue until all the values satisfy the condition. As described above, the robot arm 10A is operated so that the current image and the target image coincide with each other.

Movement Control of Workpiece According to First Embodiment

Figure 10:
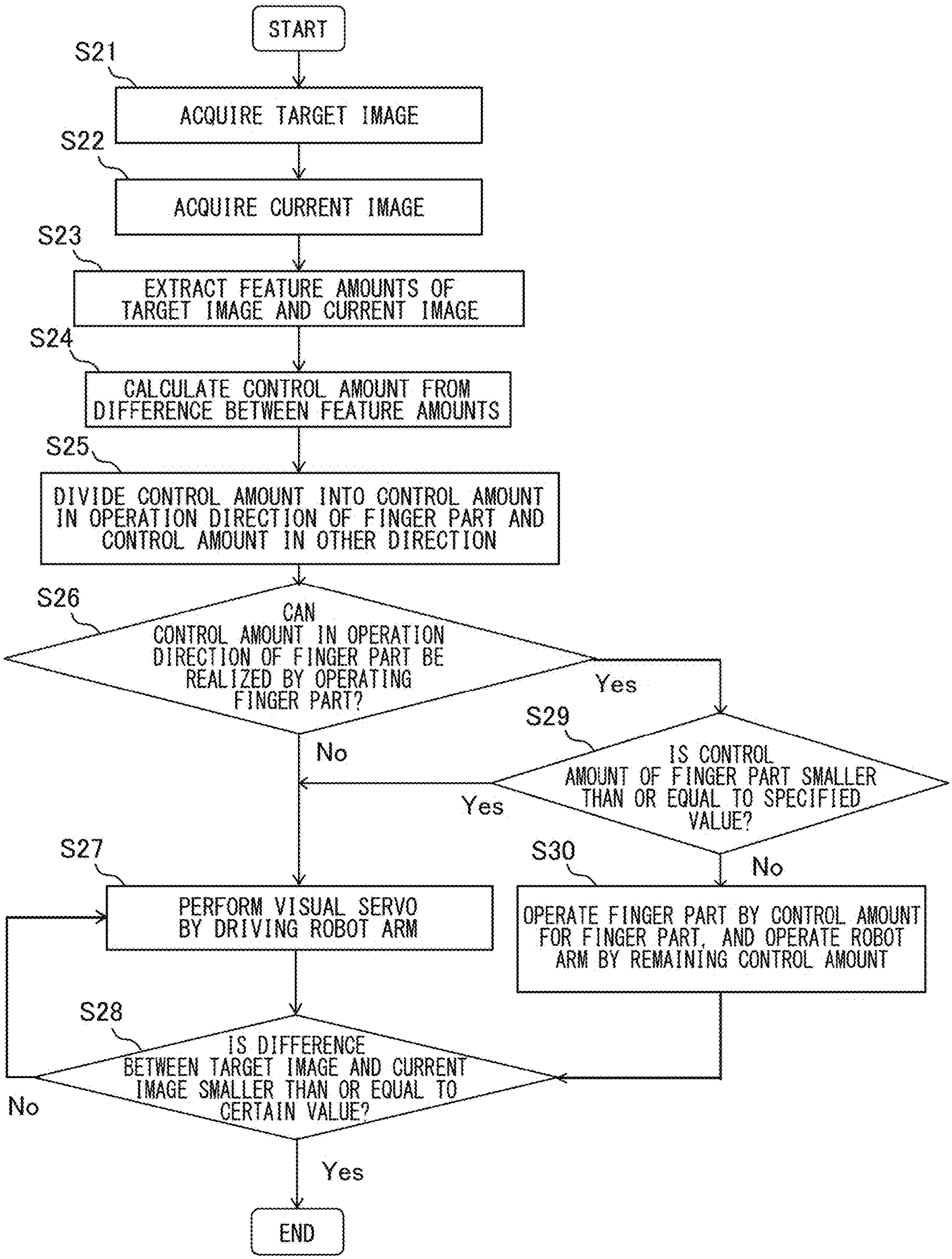
FIG. 10 is a flowchart illustrating a movement control of a workpiece according to the first embodiment.
Figure 11A:
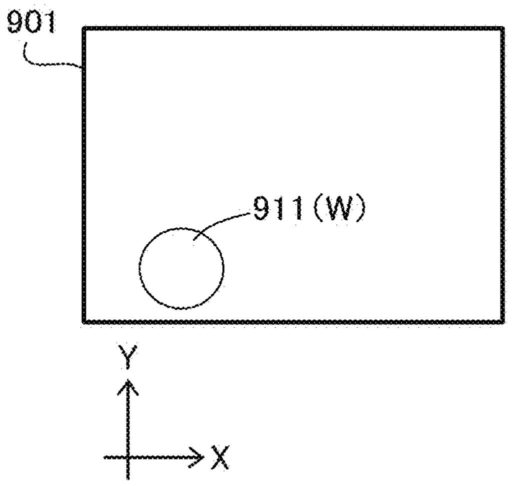
FIG. 11A is a view illustrating a captured image.
Figure 11B:
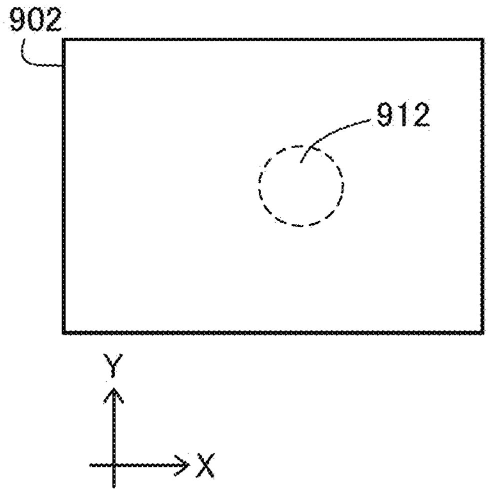
FIG. 11B is a view illustrating a target image.
Figure 11C:
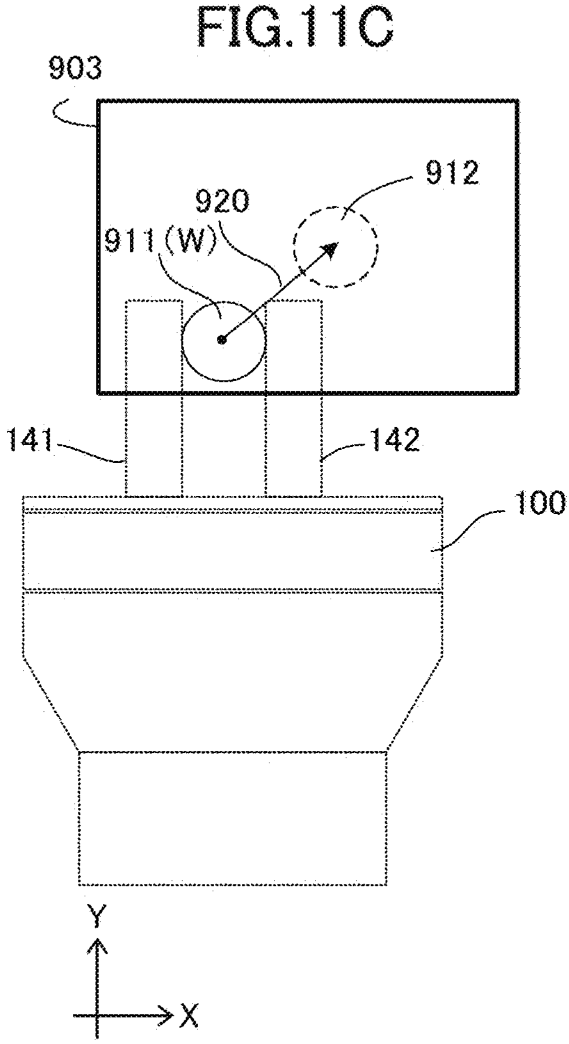
FIG. 11C is a view illustrating a movement amount of a workpiece in a visual servo control.
Figure 11D:
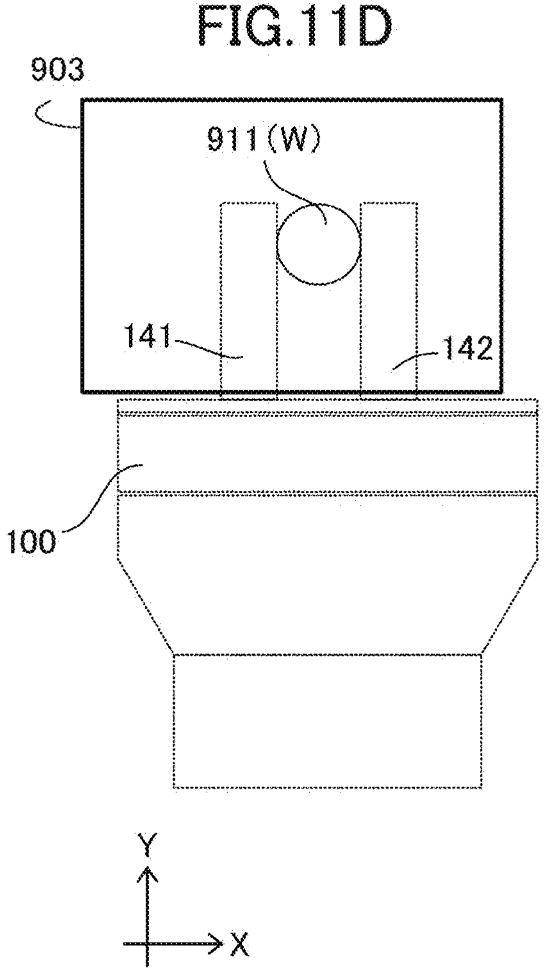
FIG. 11D is a view illustrating a state in which a robot arm is moved by the visual servo control to move the workpiece to a target position.
Figure 12C:
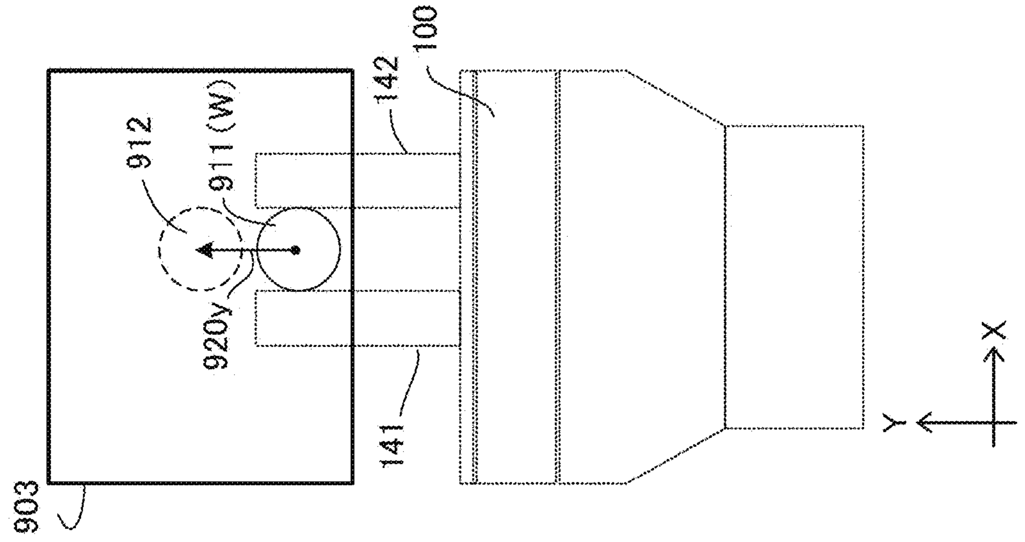
FIG. 12C is a view illustrating a state in which the workpiece is moved in an X direction and a Y direction by the finger part of the robot hand and the robot arm in the movement control of the workpiece according to the first embodiment.
Figure 12B:
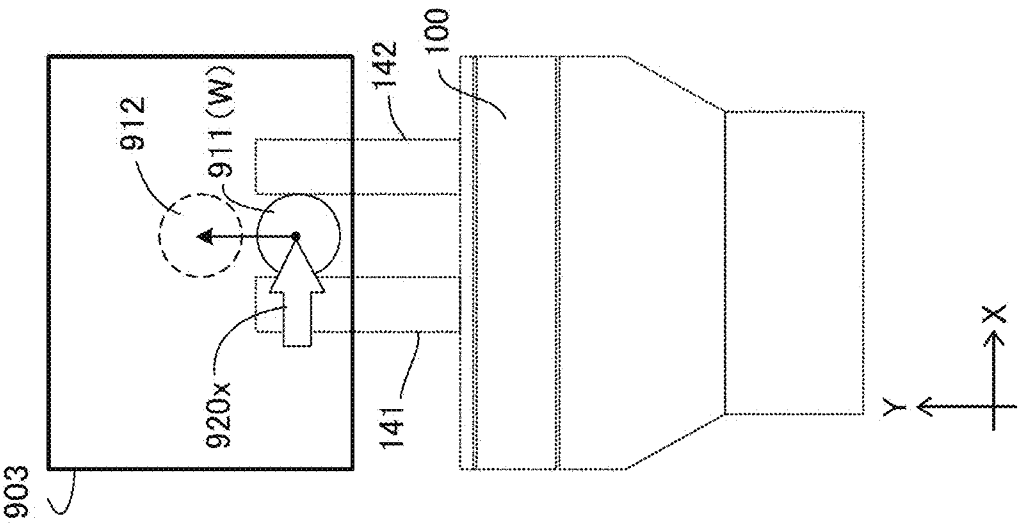
FIG. 12B is a view illustrating a state in which the workpiece is moved in an X direction by the finger part of the robot hand in the movement control of the workpiece according to the first embodiment.
Figure 12A:
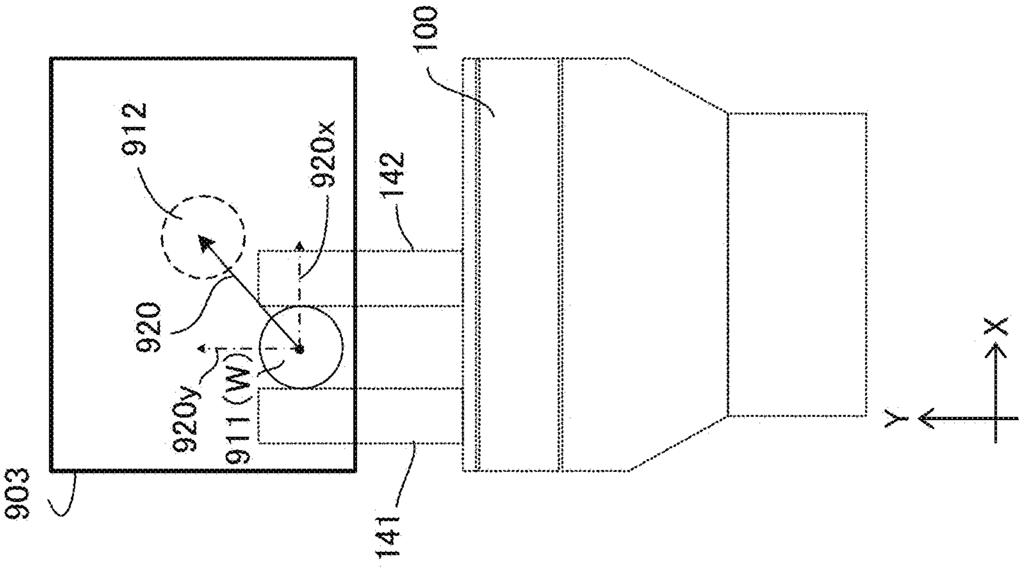
FIG. 12A is a view illustrating a movement direction of a workpiece and a movement amount in each direction in a movement control of the workpiece according to the first embodiment.

Next, a movement control of a pin W as a workpiece according to the first embodiment will be described with reference to FIGS. 10 to 12C. FIG. 10 is a flowchart illustrating a movement control of a workpiece according to the first embodiment. FIG. 11A is a view illustrating a captured image. FIG. 11B is a view illustrating a target image. FIG. 11C is a view illustrating a movement amount of a workpiece in a visual servo control. FIG. 11D is a view illustrating a state in which the robot arm is moved by the visual servo control to move the workpiece to a target position. FIG. 12A is a view illustrating a movement direction of a workpiece and a movement amount in each direction in a movement control of the workpiece according to the first embodiment. FIG. 12B is a view illustrating a state in which the workpiece is moved in the X direction by the finger part of the robot hand in the movement control of the workpiece according to the first embodiment. FIG. 12C is a view illustrating a state in which the workpiece is moved in the X direction and the Y direction by the finger part of the robot hand and the robot arm in the movement control of the workpiece according to the first embodiment.

As the movement control of the pin W according to the first embodiment, a control for moving the pin W to be aligned to the hole 402H of the assembly workpiece 402 as a work position from the state where the pin W is gripped by the finger part 140 will be described. That is, before this movement control, a control is executed to grip the pin W using the finger part 140 from the pin placing table (not illustrated), and move the robot hand 100 through the robot arm 10A to be roughly positioned above the hole 402H of the assembly workpiece 402. After this movement control, a control is executed to control the torque of the robot arm 10A to move the robot hand 100, so that the pin W is inserted into the hole 402H of the assembly workpiece 402 to be assembled. By causing the robot device 10 to perform work to repeat these controls, the plurality of pins W are assembled to the assembly workpiece 402 to manufacture an article. That is, in the following description about the movement control of the pin W, only work of aligning one pin W immediately above one hole 402H will be described.

As illustrated in FIG. 10, when a movement control of a pin W gripped by the first finger 141 and the second finger 142 is started, the CPU 201 of the control device 200 first reads a target image 902 stored in the ROM 202 or the like (S21). As illustrated in FIG. 11B, the target image 902 is an image including a target feature amount 912 as a target position of the pin W In addition, the CPU 201 captures an image of the current pin W using the camera 120 and acquires the captured image as a current image 901 (S22). As illustrated in FIG. 11A, the current image 901 is an image including a current feature amount 911 as a current position of the pin W gripped by the robot hand 100. In the current image 901 illustrated in FIG. 11A, the finger part 140 is omitted. In addition, in the target image 902 illustrated in FIG. 11B, the target feature amount 912 may be a feature amount (image) of the hole 402H of the assembly workpiece 402, rather than a feature amount (image) of the pin W as a target position.

Next, the CPU 201 extracts feature amounts (a target feature amount 912 and a current feature amount 911) from the target image 902 and the current image 901, respectively, similarly to the visual servo control described above (S23). Then, the CPU 201 calculates a control amount as a target movement amount necessary for a movement of the position of the robot arm 10A or a movement of the position of the finger part 140 of the robot hand 100 from a difference between the target feature amount 912 and the current feature amount 911 (S24). That is, as illustrated in FIG. 11C, in a composite image 903 obtained by combining the current image 901 and the target image 902, a control amount 920 is calculated as a target movement amount that is a difference between the target feature amount 912 and the current feature amount 911.

Here, as illustrated in FIG. 11D, when the pin W located at the position of the current feature amount 911 is moved to the position of the target feature amount 912 in the control amount 920, the pin W is moved by only operating the robot arm 10A (by only moving the position of the robot hand 100). In this case, since the robot arm 10A is, for example, a six-axis articulated robot, it is necessary to realize a linear movement while controlling a plurality of control axes in an accurately synchronized manner. However, in order to accurately control the plurality of control axes so as to reduce an error, for example, for the six axes, it is necessary to reduce the driving speed of the robot arm 10A. Furthermore, since the error, for example, for the six axes occurs even though it is slight, when the pin W is aligned to the position of the target feature amount 912, there is a problem that it takes time to converge the alignment by feedback control in visual servo control.

Therefore, in the movement control of the pin W according to the present embodiment, the first mode (first step) and the second mode (second step) can be executed as follows. That is, the first mode is a mode in which the position of the pin W (object) is moved by controlling the robot arm 10A to move the position of the robot hand 100. The second mode is a mode in which the moving part 130 of the robot hand 100 is controlled to linearly move the position of the pin W (object) using the first guide part 170 and the second guide part 180 described above. In the movement control of the pin W according to the present embodiment, it is determined whether to execute, only the first mode, only the second mode, or both the first mode and the second mode based on the control amount 920 obtained as described above (that is, based on the target image and the current image), and the process proceeds to the execution of the first mode and/or the second mode.

Roughly speaking, if the control amount 920 (that is, the difference between the current position of the pin W and the target position) is a minute value such as a specified value or smaller, the visual servo of the robot arm 10A does not require much time, and thus, only the first mode is executed. If the control amount 920 is a value larger than the specified value and the movement direction of the pin W in the control amount 920 includes a component in the movement direction of the finger part 140 using the moving part 130, both the second mode and the first mode are executed while the second mode is given priority. That is, a necessary control amount (a movement amount of the pin W) is divided into a control amount of the finger part 140 of the robot hand 100 and the other control amount, and the operation of the robot arm 10A is reduced by allocating an operation to the robot hand 100 having fewer control axes. In this case, if the movement direction of the pin W in the control amount 920 is only the movement direction of the finger part 140 using the moving part 130, only the second mode is inevitably executed.

Specifically, first, the CPU 201 converts the control amount 920 obtained as described above into a control amount based on a certain coordinate reference. In general, a control amount is managed based on the robot coordinate reference, and a start point is often set at a tool center point (TCP). Then, as illustrated in FIG. 12A, the CPU 201 divides the control amount 920 into a first control amount 920*x* and a second control amount 920*y* as viewed based on the certain coordinate reference. That is, the first control amount 920*x* as a first movement amount is a control amount in the operation direction (for example, the X direction) as a first direction in which the finger part 140 can be operated. The second control amount 920*y* as a second movement amount is a control amount in a second direction (for example, the Y direction) that is a direction other than the first direction and is different from the first direction.

Next, it is determined whether the first control amount 920*x* in the operation direction of the finger part 140 divided as described above can be realized by operating (moving) the finger part 140 (the first finger 141 and the second finger 142), that is, whether the second mode can be executed (S26). For example, when the movable amount from the current position of the pin W to the end of the movable range of the finger part 140 is smaller than the first control amount 920*x*, it is determined that the first control amount 920*x* cannot be realized by moving the finger part 140 (No in S26). That is, when the first control amount 920*x* is larger than the movable amount of the finger part 140, it is determined that the first control amount 920*x* cannot be realized by moving the finger part 140. In this case, the CPU 201 determines that the second mode cannot be executable, and selects execution of the first mode only, that is, performs visual servo by only driving the robot arm 10A (S27). As a result, the pin W is moved by visual servo by the robot arm 10A together with the robot hand 100 and is aligned to the target position (see FIGS. 11C and 11D). Then, the visual servo continues until the difference between the target image (the target feature amount 912) and the current image (the current feature amount 911) becomes smaller than or equal to a certain value (No in S28), and the movement control of the pin W is terminated when the difference between the target image and the current image becomes smaller than or equal to a certain value (Yes in S28).

On the other hand, when it is determined that the first control amount 920*x* can be realized by moving the finger part 140 (Yes in S26), the CPU 201 determines whether the first control amount 920*x* (the control amount of the finger part) in which the finger part 140 is controlled is smaller than or equal to the specified value (S29). When the first control amount 920*x* of the finger part is smaller than or equal to the specified value, that is, when the movement amount of the pin W is minute, it does not take much time even if the visual servo of the robot arm 10A is performed, and thus, the process proceeds to step S27 described above. In this case as well, the CPU 201 selects execution of the first mode only, that is, performs visual servo by only driving the robot arm 10A (S27). As a result, the pin W is moved by visual servo by the robot arm 10A until the difference between the target image and the current image becomes smaller than or equal to the certain value (No in S28), and the movement control of the pin W is terminated when the difference between the target image and the current image becomes smaller than or equal to a certain value (Yes in S28).

When the CPU 201 determines that the first control amount 920*x* can be realized by moving the finger part 140 (Yes in S26) and further determines that the first control amount 920*x* is not smaller than or equal to the specified value (No in S29), the process proceeds to step S30. Then, as illustrated in FIG. 12A, the CPU 201 executes the second mode for the first control amount 920*x* obtained by dividing the control amount 920 in the operation direction of the finger part 140. That is, as illustrated in FIG. 12B, the finger part 140 is moved by the moving part 130 of the robot hand 100 in the first control amount 920*x*, and the position of the pin W is moved in the first direction by the first control amount 920*x*. At this time, when the pin W is moved by the finger part 140, the first finger 141 is driven earlier than the second finger 142 as described above (see FIG. 6C). Furthermore, in the second mode at this time, rather than performing visual servo to move the finger part 140, a drive command corresponding to the first control amount 920*x* is given to the moving part 130 to move the position of the pin W Note that visual servo may be performed to move the finger part 140.

The CPU 201 executes the first mode for the remaining second control amount 920*y* obtained by dividing the control amount 920. That is, as illustrated in FIG. 12C, the finger part 140 is moved by the robot arm 10A together with the robot hand 100 in the second control amount 920*y*, and the position of the pin W is moved in the second direction by the second control amount 920*y*. At this time, in the first mode as well, rather than performing visual servo to move the robot arm 10A, a drive command corresponding to the second control amount 920*y* is given to the servo control unit 210 to move the position of the pin W Of course, visual servo may be performed to move the robot arm 10A. Although the control amount of the robot arm 10A is not mentioned here, for example, when the control amount of the robot arm 10A is smaller than or equal to a preset value, only the finger part 140 may be operated by the moving part 130, and the operation of the robot arm 10A may be omitted.

Then, it is determined whether the difference between the target image and the current image is smaller than or equal to the certain value (S28). Here, since the pin W should have been moved by the control amount 920, the difference between the target image and the current image should be smaller than or equal to the certain value (Yes in S28). Note that, if the difference between the target image and the current image is not smaller than or equal to the certain value (No in S28), the pin W is moved by visual servo by the robot arm 10A until the difference between the target image and the current image becomes smaller than or equal to the certain value. Then, the movement control of the pin W described above is terminated.

Summary of First Embodiment

As described above, in the first embodiment, the movement of the position of the pin W is controlled based on a captured current image and a target image. In this case, a first mode in which the pin W is moved by driving the robot arm 10A and a second mode in which the pin W is moved by driving the finger part 140 using the moving part 130 can be executed. As a result, some or all of the burden generated when the plurality of control axes of the robot arm 10A are accurately driven can be borne by the second mode, shortening the time required for the movement control for moving the position of the pin W.

In addition, a control amount 920 in which the position of the pin W is moved is calculated based on the current image and the target image, and the control amount 920 is divided into a first control amount 920*x* in a first direction in which the pin W can be moved by the moving part 130 and a second control amount 920*y* in a second direction. This makes it possible to determine whether the first control amount 920*x* can be realized by operating the finger part 140.

For example, an assembly workpiece 402 has a plurality of holes 402H (see FIG. 1), to which pins W are to be assembled, are provided at known positions. Then, for example, after a movement control of a first pin W is executed for the pins W, a movement control of a second pin W may be performed for a hole 402H located at a known position with respect to a hole 402H into which the first pin W is inserted. In this case, in step S24, a target movement amount in which the position of the pin W is to be moved (that is, a movement direction and a movement amount to the hole 402H into which the second pin W is to be inserted) can be calculated based on the current image, the target image, and the target position located at the known position with respect to the target image. In particular, the hole 402H into which the second pin W is to be inserted may be disposed alongside the hole 402H into which the first pin W is inserted in the movement direction of the finger part 140. In this case, by executing the second mode, the alignment of the second pin W can be easily performed, shortening the time.

In the movement control of the pin W described above, visual servo is not performed by the robot arm 10A in step S30. However, the present disclosure is not limited thereto, and for example, after only the finger part 140 is operated by the moving part 130 in step 30, the process may proceed to step 27, and visual servo may be performed by the robot arm 10A. In this case, it is possible to generate a new target image excluding the first control amount 920*x* of the finger part 140, thereby calculating a remaining control amount, and to perform visual servo using the robot arm 10A for the remaining control amount.

In the movement control of the pin W described above, when the first control amount 920*x* is larger than the movable amount of the finger part 140 in step S26, it is determined that the second mode cannot be executed. However, the present disclosure is not limited thereto, and it may be determined to execute the second mode even though the first control amount 920*x* is larger than the movable amount of the finger part 140. That is, for the first control amount 920*x*, the pin W may be moved by executing the second mode by the movable amount of the finger part 140, and the pin W may be moved by executing the first mode by the remaining control amount. In particular, in this case, by determining to execute the second mode when the divided first control amount 920*x* (first movement amount) is larger than the divided second control amount 920*y* (second movement amount), it is possible to reduce the control amount (movement amount) in the first mode and shorten the time.

Second Embodiment

Figure 13A:
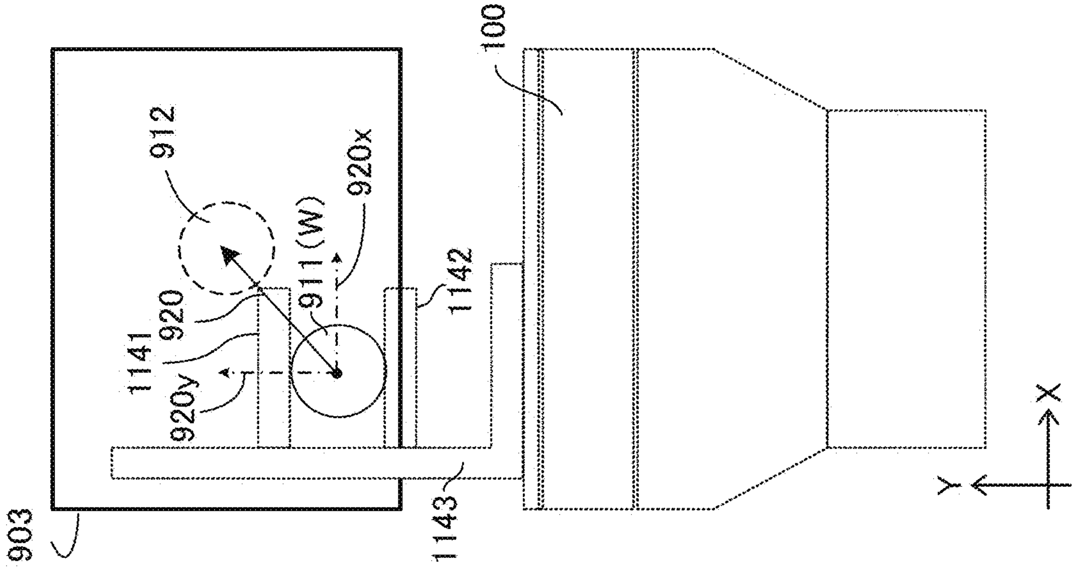
FIG. 13A is a view illustrating a movement direction of a workpiece and a movement amount in each direction in a movement control of the workpiece according to a second embodiment.
Figure 13B:
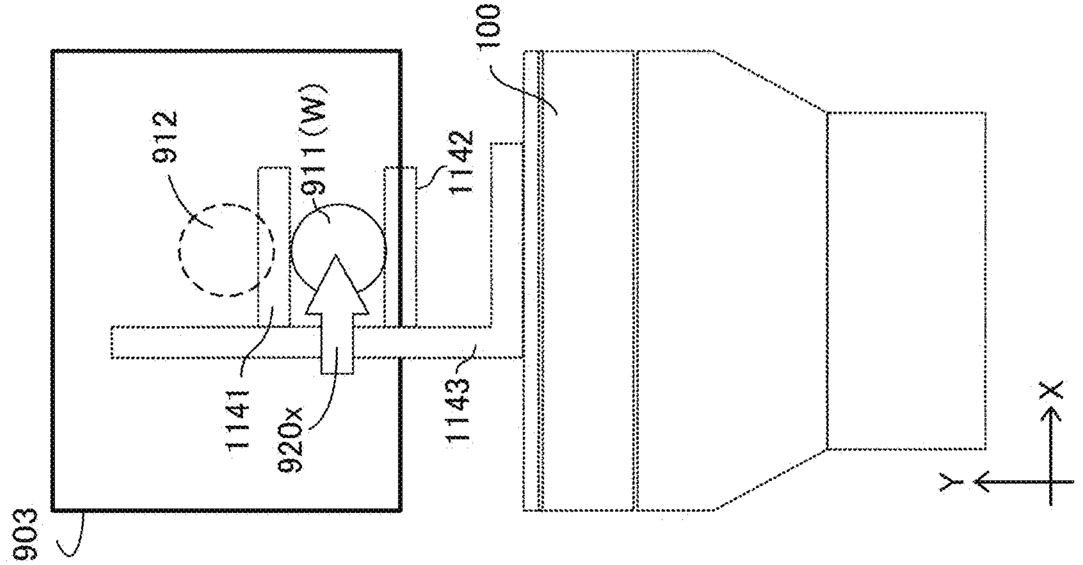
FIG. 13B is a view illustrating a state in which the workpiece is moved in an X direction by a finger part of a robot hand in the movement control of the workpiece according to the second embodiment.
Figure 13C:
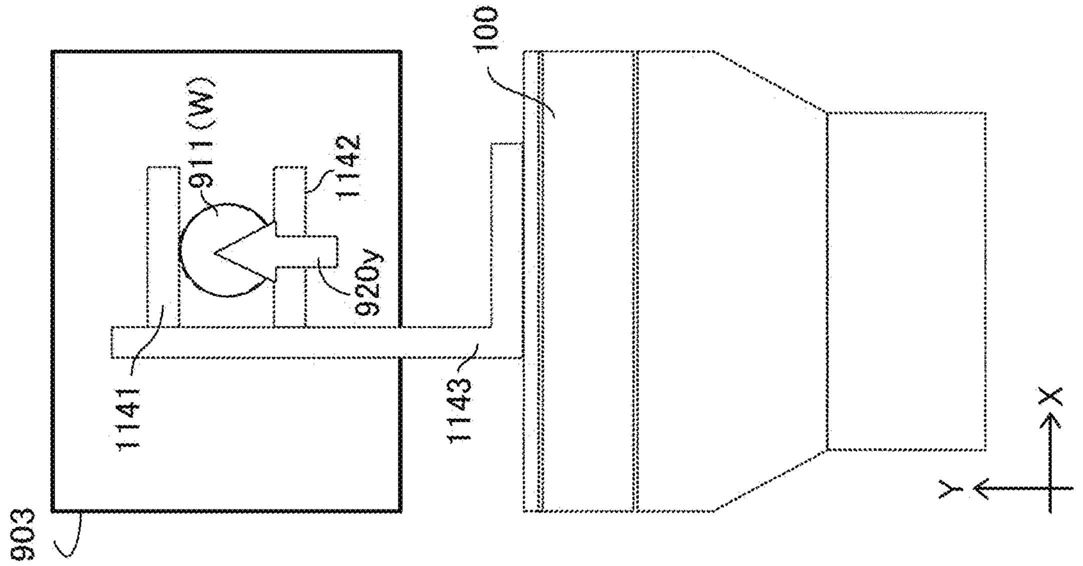
FIG. 13C is a view illustrating a state in which the workpiece is moved in an X direction and a Y direction by the finger part of the robot hand in the movement control of the workpiece according to the second embodiment.

Next, a second embodiment partially modified from the first embodiment will be described with reference to FIGS. 13A to 13C. FIG. 13A is a view illustrating a movement direction of a workpiece and a movement amount in each direction in a movement control of the workpiece according to the second embodiment. FIG. 13B is a view illustrating a state in which the workpiece is moved in an X direction by a finger part of a robot hand in the movement control of the workpiece according to the second embodiment. FIG. 13C is a view illustrating a state in which the workpiece is moved in the X direction and the Y direction by the finger part of the robot hand in the movement control of the workpiece according to the second embodiment.

In the second embodiment, as compared with the first embodiment, the finger part can be moved by the moving part in two movement directions (two coordinate directions), that is, the position of the pin W can be moved on a plane including the X direction and the Y direction in the second mode.

Specifically, as illustrated in FIG. 13A, the robot hand 100 according to the second embodiment has a finger base 1143 attached so as to be movable by the moving part (not illustrated) in the X direction which is a first direction. A first finger 1141 and a second finger 1142 are attached to the finger base 1143 so as to be movable by the moving part (not illustrated) in the Y direction. Therefore, in the robot hand 100 according to the second embodiment, the pin W gripped by the first finger 1141 and the second finger 1142 can be moved on the plane including the X direction and the Y direction, that is, the pin W is movable on the plane in the second mode.

In the robot hand 100 configured in this manner, when a movement control of a pin W is executed (see FIG. 10), as illustrated in FIG. 13A, first, the CPU 201 calculates a control amount 920 based on the target image and the current image (S24). Next, the control amount 920 is divided into a first control amount 920*x* in the X direction and a second control amount 920*y* in the Y direction (S25), and here, both directions are operation directions of the finger part. Therefore, it is determined that the control amount in the operation direction of the finger part can be realized by operating the finger, and it is determined that the control amount of the finger part is smaller than or equal to the specified value and the second mode can be executed (Yes in S29). In this case, as illustrated in FIG. 13B, the pin W is moved in the first control amount 920*x* by moving the finger base 1143. As illustrated in FIG. 13C, the pin W is moved in the second control amount 920*y* by moving the first finger 1141 and the second finger 1142 (S30). That is, in the second embodiment, it is not necessary for the robot arm 10A to perform an operation corresponding to the remaining control amount, that is, the pin W is moved only in the second mode without executing the first mode. That is, since the movement of the pin W by the robot arm 10A is not required, all of the burden generated when the plurality of control axes of the robot arm 10A are accurately driven can be borne by the second mode, shortening the time required for the movement control for moving the position of the pin W.

Other configurations, operations, and effects of the second embodiment are the same as those of the first embodiment, and thus, the description thereof will be omitted.

OTHER EMBODIMENTS

In the first and second embodiments described above, a movement of a position of a pin Was a workpiece is controlled, but the object is not limited to the workpiece. For example, before gripping a pin as a workpiece, a distal end portion of the finger part (the first finger and the second finger) is treated as an object, and its movement is controlled. In this case, the position of the finger part is moved by the moving part of the end effector as a second mode, and the position of the finger part is moved by the robot together with the end effector as a first mode. Furthermore, for example, if the end effector includes a tool such as a driver, tweezers, or the like, for example, a distal end portion of the tool may be treated as an object, and a movement of its position may be controlled. In this case, the position of the tool is moved by the moving part of the end effector as a second mode, and the position of the tool is moved by the robot together with the end effector as a first mode.

In the first and second embodiments, a movement amount (control amount) of a pin is calculated based on a current image obtained by imaging the pin W and a target image as a target position of the pin W However, the present disclosure is not limited thereto, and for example, a movement amount (control amount) of a pin may be calculated based on a current image obtained by imaging a hole 402H of an assembly workpiece 402, a target image as a target position of the hole 402H, and a position of the pin W (finger part) in the end effector. In addition, it has been described that images in the field of view of the camera 120 fixedly supported by the robot hand 100 serving as an end effector are used as the current image and the target image, but the present disclosure is not limited thereto. That is, the camera may be supported at a predetermined position of the robot arm 10A, or the camera may be supported on a ceiling of a factory or the like where the robot system 1 is installed. That is, the coordinate system may be converted based on the position of the camera to calculate a movement direction of an object and calculate a movement amount (control amount) thereof.

In the first embodiment, the robot hand 100 slides the first finger 141 and the second finger 142, but the present disclosure is not limited to this configuration. For example, the robot hand 100 may have three or more fingers, or the fingers may move on an arc rather than moving on a straight line. In addition, it has been described that the first guide part 170 and the second guide part 180 are provided so as to slide the first finger 141 and the second finger 142, but the present disclosure is not limited thereto, and one guide part or three or more guide parts may be provided. Of course, when a plurality of guide parts are provided, the first finger 141 and the second finger 142 move stably and the workpiece is also gripped stably. Therefore, it is preferable to provide two or more guide parts. Although it has also been described that the first finger and the second finger are driven by the motor 151 and the motor 161, the present disclosure is not limited thereto, and the first finger 141 and the second finger 142 may be driven by, for example, solenoids or hydraulic pressures. In the second embodiment as well, the number of fingers may be three or more.

In the first and second embodiments, the robot arm 10A is controlled to be driven in the first mode, and the moving part 130 is controlled to be driven in the second mode. However, the present disclosure is not limited thereto, and the first joint J1 to the fifth joint J5 of the robot arm 10A may be controlled to be driven in the first mode, and the moving part 130 and the sixth joint J6 may be controlled to be driven in the second mode. In this case, in the second mode, the X direction, which is a movement direction of the finger part 140, can be rotated around the sixth joint J6, and in particular, even in the structure of the robot hand 100 as in the first embodiment, the finger part 140 (the pin W) can be moved on a plane.

In addition, the present disclosure is not limited to the embodiments described above, and the embodiments can be modified in various ways within the technical idea of the present disclosure. For example, at least two of the plurality of embodiments and the plurality of modifications described above may be combined. In addition, the effects described in the embodiments are merely the most preferable effects enumerated among the results of the embodiments of the present disclosure, and the effects of the embodiments of the present disclosure are not limited to those described in the present embodiment.

Furthermore, in the first and second embodiments described above, the robot main body is a vertically articulated robot, but the present disclosure is not limited thereto. The robot main body may be, for example, a horizontally articulated robot, a parallel link robot, or an orthogonal robot. In addition, the above-described embodiments can be applied to a machine capable of automatically performing an operation for expansion and contraction, bending and stretching, vertical movement, horizontal movement, turning, or a combination thereof based on information in the storage device provided in the control device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-163125, filed Sep. 26, 2023, which is hereby incorporated by reference herein in its entirety.

What is claimed is:

1. A robot device comprising:

an imaging unit configured to capture an image;

an end effector including a base part and a moving part configured to move an object with respect to the base part;

a robot configured to support the end effector in such a manner that the robot can move a position of the end effector; and a control unit configured to control the imaging unit, the moving part, and the robot, wherein the end effector includes a gripping part configured to grip and support the object, and the moving part is configured to move the gripping part, wherein the gripping part includes a first finger configured to abut on one side of the object and a second finger configured to abut on another side of the object, with the object being gripped by the first finger and the second finger in a sandwiched manner therebetween, wherein the moving part includes a sliding part configured to slidably support the first finger and the second finger, a first driving part configured to drive the first finger to slide on the sliding part, and a second driving part configured to drive the second finger to slide on the sliding part, wherein if the first finger and the second finger are slid on the sliding part, the control unit is configured to drive the first finger earlier than the second finger in a case where the object is moved from the one side to the other side, and drive the second finger earlier than the first finger in a case where the object is moved from the other side to the one side, wherein in a case where a movement control is executed to move a position of the object based on the image captured by the imaging unit and a target image, the control unit is configured to execute a first mode in which the position of the object is moved by controlling the robot to move the position of the end effector, and a second mode in which the position of the object is moved by controlling the moving part.

2. The robot device according to claim 1, wherein the control unit is configured to calculate a first movement amount and a second movement amount based on the image captured by the imaging unit and the target image, the first movement amount being a movement amount of the position of the object in a first direction in which the position of the object is movable by the moving part, and the second movement amount being a movement amount of the position of the object in a second direction different from the first direction, and in a case where it is determined to execute the second mode based on the first movement amount, the control unit is configured to move the position of the object by the first movement amount in the second mode, and move the position of the object by the second movement amount in the first mode.

3. The robot device according to claim 1, wherein the control unit is configured to calculate a first movement amount and a second movement amount based on the image captured by the imaging unit, the target image, and a target position known with respect to the target image, the first movement amount being a movement amount of the position of the object in a first direction in which the position of the object is movable by the moving part, and the second movement amount being a movement amount of the position of the object in a second direction different from the first direction, and in a case where it is determined to execute the second mode based on the first movement amount, the control unit is configured to move the position of the object by the first movement amount in the second mode, and move the position of the object by the second movement amount in the first mode.

4. The robot device according to claim 2, wherein the control unit is configured to determine to execute the second mode in a case where the first movement amount is larger than the second movement amount.

5. The robot device according to claim 2, wherein the control unit is configured to determine to execute the second mode in a case where the first movement amount is larger than a preset specified value.

6. The robot device according to claim 2, wherein the control unit is configured to move the position of the object in the first mode in a case where it is determined that the second mode is not executable based on the first movement amount.

7. The robot device according to claim 1, wherein the control unit is configured to execute visual servo based on the image captured by the imaging unit and the target image in a case where the position of the object is moved in the first mode.

8. The robot device according to claim 7, wherein the control unit is configured to execute the visual servo until a difference between the image captured by the imaging unit and the target image becomes smaller than or equal to a certain value.

9. The robot device according to claim 1, wherein the moving part is configured to linearly move the object with respect to the base part.

10. The robot device according to claim 1, wherein the moving part is configured to move the object on a plane with respect to the base part.

11. The robot device according to claim 1, wherein the object is a workpiece.

12. The robot device according to claim 1, wherein the imaging unit is supported by the base part.

13. A method of controlling the robot device according to claim 1, the method comprising:

a first step in which in a case where a movement control is executed to move the position of the object by controlling the robot with visual servo control, the control unit controls the robot to move the position of the end effector gripping the object; and a second step in which in a case where the movement control is executed, the control unit moves the position of the object by controlling the moving part.

14. A non-transitory computer-readable recording medium storing a program for causing a computer to execute the robot device controlling method according to claim 13.

* * * * *